US012317307B2

(12) United States Patent
Liu et al.

(10) Patent No.: US 12,317,307 B2
(45) Date of Patent: May 27, 2025

(54) SIGNALING FOR NETWORK CODING OF SIDELINK COMMUNICATIONS

(71) Applicant: QUALCOMM Incorporated, San Diego, CA (US)

(72) Inventors: Guangyi Liu, San Diego, CA (US); Gabi Sarkis, San Diego, CA (US); Hong Cheng, Basking Ridge, NJ (US)

( * ) Notice: Subject to any disclaimer, the term of this patent is extended or adjusted under 35 U.S.C. 154(b) by 891 days.

(21) Appl. No.: 17/461,802

(22) Filed: Aug. 30, 2021

(65) Prior Publication Data
US 2023/0063027 A1  Mar. 2, 2023

(51) Int. Cl.
*H04W 72/56* (2023.01)
*H04W 4/029* (2018.01)

(52) U.S. Cl.
CPC ........... *H04W 72/56* (2023.01); *H04W 4/029* (2018.02)

(58) Field of Classification Search
CPC ..... H04W 88/04; H04W 92/18; H04W 68/02; H04W 76/14; H04W 12/104; H04W 12/122; H04W 12/63; H04W 12/66; H04W 64/00; H04W 64/006; H04W 72/563; H04W 8/22
USPC ..... 455/456.1, 458, 410; 370/329, 328, 277, 370/235, 252
See application file for complete search history.

(56) References Cited

U.S. PATENT DOCUMENTS

| | | | | |
|---|---|---|---|---|
| 12,068,848 B2* | 8/2024 | Goldhamer | ........... | H04L 1/0063 |
| 2015/0319796 A1* | 11/2015 | Lu | ......... | H04W 76/14 |
| | | | | 370/330 |
| 2018/0279319 A1* | 9/2018 | Yu | ......... | H04W 40/12 |
| 2020/0351032 A1* | 11/2020 | Wu | ........ | H04W 72/20 |
| 2021/0387621 A1* | 12/2021 | Takano | ........... | B60W 30/165 |
| 2022/0045830 A1* | 2/2022 | Osawa | ......... | H04L 5/0066 |
| 2022/0174649 A1* | 6/2022 | Ashraf | ....... | H04W 4/70 |
| 2023/0011379 A1* | 1/2023 | Thommana | ........ | H04B 7/18539 |
| 2023/0144480 A1* | 5/2023 | Liu | ......... | H04W 40/22 |
| | | | | 370/329 |
| 2023/0284232 A1* | 9/2023 | Wang | ........ | H04W 72/569 |
| | | | | 370/329 |
| 2024/0251228 A1* | 7/2024 | Chun | ......... | H04W 88/04 |

* cited by examiner

*Primary Examiner* — Joseph Arevalo

(57) ABSTRACT

Disclosed are systems and techniques for performing wireless communication. In some aspects, a wireless communication device may determine at least one parameter associated with a sidelink communication. Based on the at least one parameter, the wireless communication device may determine a status of a network coding indicator corresponding to the sidelink communication. The wireless communication device may transmit the sidelink communication and the network coding indicator including the determined status to at least one network entity configured to perform network coding.

16 Claims, 10 Drawing Sheets

SIGNALING FOR NETWORK CODING OF SIDELINK COMMUNICATIONS

FIELD OF THE DISCLOSURE

Aspects of the present disclosure generally relate to wireless communication. In some implementations, examples are described for performing signaling to a network encoder for network coding of device-to-device communications (e.g., PC5 sidelink communications, Dedicated Short Range Communication (DSRC), and/or other device-to-device communications).

BACKGROUND OF THE DISCLOSURE

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

Aspects of LTE, 5G, and/or other communications protocols may support direct communications between devices, which may be referred to as sidelink communications. As used herein, sidelink or sidelink communications generally refers to any direct device-to-device communication protocol. For example, the term sidelink may refer to 3GPP sidelink (e.g., using a PC5 sidelink interface). Sidelink may also refer to a Wi-Fi protocol for direct device-to-device communications, referred to as Dedicated Short Range Communication (DSRC) protocol. As the demand for mobile broadband access and general communications continues to increase, further improvements in 5G, LTE, and other radio access technologies, as well as other communications technologies (e.g., WiFi, etc.), remain useful.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one example, a method is provided for wireless communication. The method may include: determining, by a user equipment (UE) device, at least one parameter associated with a sidelink communication; determining, based on the at least one parameter, a status of a network coding indicator corresponding to the sidelink communication; and transmitting, by the UE device, the sidelink communication and the network coding indicator including the determined status to at least one network entity configured to perform network coding.

In another example, a wireless communication device for wireless communication is provided that includes at least one memory and at least one processor (e.g., configured in circuitry) communicatively coupled to the memory. The at least one processor may be configured to: determine at least one parameter associated with a sidelink communication; determine, based on the at least one parameter, a status of a network coding indicator corresponding to the sidelink communication; and transmit the sidelink communication and the network coding indicator including the determined status to at least one network entity configured to perform network coding.

In another example, a non-transitory computer-readable medium of a wireless communication device is provided that includes stored thereon at least one instruction that, when executed by one or more processors, may cause the one or more processors to: determine at least one parameter associated with a sidelink communication; determine, based on the at least one parameter, a status of a network coding indicator corresponding to the sidelink communication; and transmit the sidelink communication and the network coding indicator including the determined status to at least one network entity configured to perform network coding.

In another example, an apparatus for wireless communication is provided. The apparatus may include: means for determining at least one parameter associated with a sidelink communication; means for determining, based on the at least one parameter, a status of a network coding indicator corresponding to the sidelink communication; and means for transmitting the sidelink communication and the network coding indicator including the determined status to at least one network entity configured to perform network coding.

In another example, a method for wireless communication is provided. The method may include: receiving, by a network coding device from a transmitting user equipment (UE) device, a sidelink communication associated with a request for network coding; receiving, by the network coding device, a set of signaling information associated with the sidelink communication; and determining whether to perform network coding of the sidelink communication based on the set of signaling information.

In another example, a wireless communication device for wireless communication is provided that includes at least one memory and at least one processor (e.g., configured in circuitry) communicatively coupled to the memory. The at least one processor may be configured to: receive, from a transmitting user equipment (UE) device, a sidelink communication associated with a request for network coding; receive a set of signaling information associated with the sidelink communication; and determine whether to perform network coding of the sidelink communication based on the set of signaling information.

In another example, a non-transitory computer-readable medium of a wireless communication device is provided that includes stored thereon at least one instruction that, when executed by one or more processors, may cause the one or more processors to: receive, from a transmitting user equipment (UE) device, a sidelink communication associated with a request for network coding; receive a set of signaling information associated with the sidelink communication; and determine whether to perform network coding of the sidelink communication based on the set of signaling information.

In another example, an apparatus for wireless communication is provided. The apparatus may include: means for determining at least one parameter associated with a sidelink communication; means for receiving, from a transmitting user equipment (UE) device, a sidelink communication associated with a request for network coding; means for receiving a set of signaling information associated with the sidelink communication; and means for determining whether to perform network coding of the sidelink communication based on the set of signaling information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided for illustration of the aspects and not limitation thereof.

DETAILED DESCRIPTION

Figure 1:
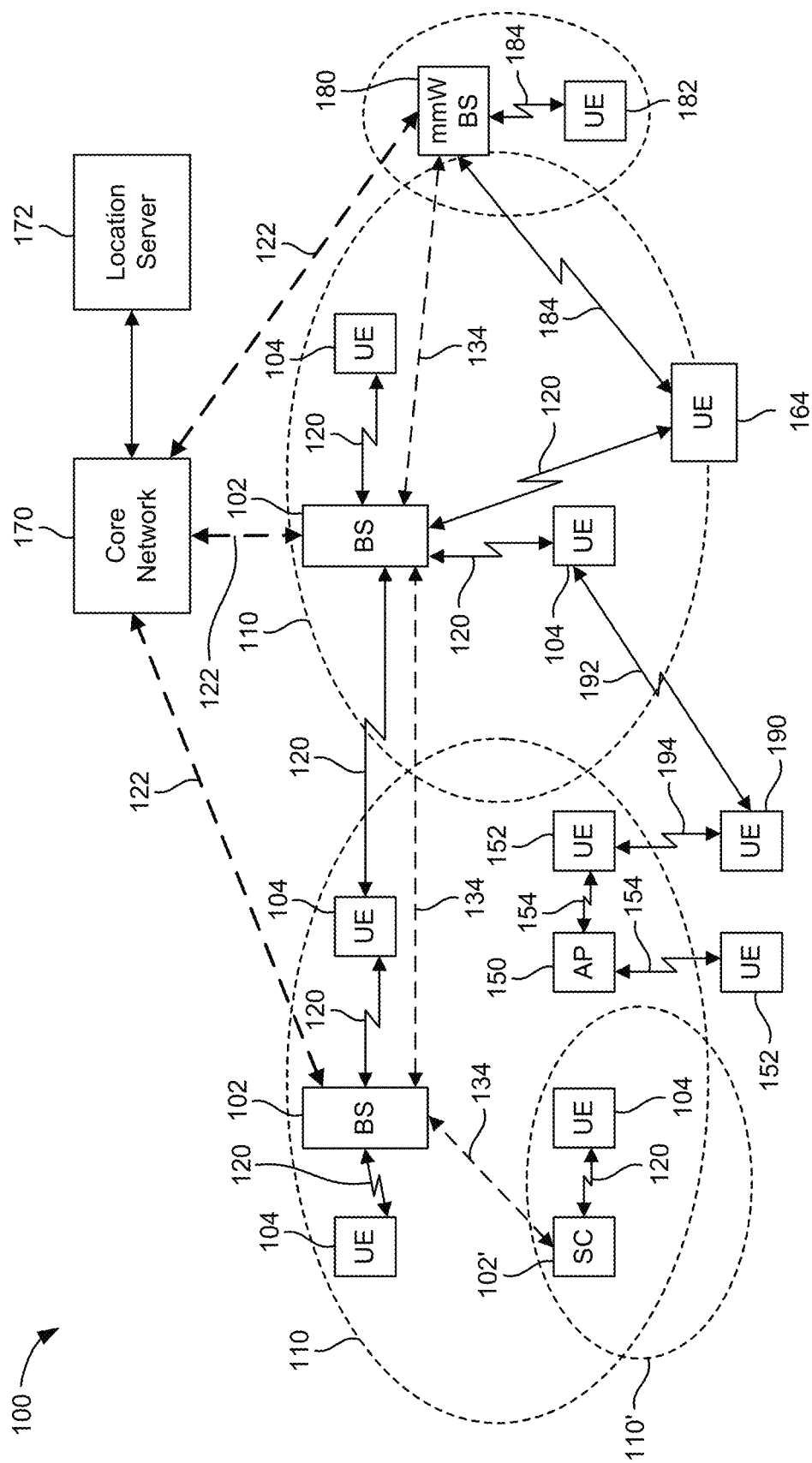
FIG. 1 is a block diagram illustrating an example of a wireless communication network, according to aspects of the disclosure.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Wireless communication networks are deployed to provide various communication services such as voice, video, packet data, messaging, broadcast, and the like. A wireless communication network may support both access links and sidelinks for communication between wireless devices. An access link may refer to any communication link between a client device (e.g., a user equipment (UE), a station (STA), or other client device) and a base station (e.g., a 3GPP gNB, a 3GPP eNB, a Wi-Fi access point (AP), or other base station). For example, an access link may support uplink signaling, downlink signaling, connection procedures, etc.

A sidelink may refer to any communication link between client devices (e.g., UEs, STAB, etc.). For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs. In some examples, sidelink communications may be transmitted using a licensed frequency spectrum or an unlicensed frequency spectrum (e.g., 5 GHz or 6 GHz). As used herein, the term sidelink may refer to 3GPP sidelink (e.g., using a PC5 sidelink interface), Wi-Fi direct communications (e.g., according to a Dedicated Short Range Communication (DSRC) protocol), or using any other direct device-to-device communication protocol.

In some configurations, a transmitting UE device may transmit a sidelink communication to two or more receiving UE devices. In some cases, if one of the receiving UE devices fails to decode the sidelink communication, the receiving UE device may send feedback (e.g., a negative acknowledgment or NACK) to the transmitting UE device indicating that reception of the sidelink communication failed. In some instances, a transmitting UE device may retransmit the sidelink communication in response to receiving a NACK from a receiving UE device. In some cases, such retransmissions of sidelink communications by transmitting UE devices may degrade network or system performance.

In some aspects, network coding may be used to increase system capacity and improve resource allocation. For example, network coding may be used to combine (e.g., encode) data from two or more transmissions into a single transmission. Such network coding can reduce retransmissions of sidelink communications. In some aspects, network coding may be implemented by using an exclusive OR function, a linear function, erasure coding (e.g., maximum distance separable (MDS) erasure code, Reed-Solomon codes), and/or any other suitable network coding algorithm. In some aspects, a receiving UE device may implement an erasure coding algorithm to determine or extract data associated with sidelink communications. For example, a receiving UE device may use single parity check codes to correct a single erasure. In some cases, a single erased element can be recovered based the non-erased elements. In some examples, a receiving UE device may use MDS codes to correct two or more erasures. For instance, Reed-Solomon codes may be used to decode any k symbols of an n symbol code word.

In some aspects, network coding may be performed by a network coding device (e.g., a base station, a road side unit, a UE device, etc.). In some cases, a transmitting UE device may be configured to request network coding of a sidelink transmission from a network coding device. In some examples, the transmitting UE device may be configured to request network coding using signaling that may include a network coding indicator and network coding request data.

Systems, apparatuses, processes (also referred to as methods), and computer-readable media (collectively referred to as "systems and techniques") are described herein for providing improved signaling for network coding of sidelink communications. The systems and techniques provide the ability for client devices (e.g., UE devices) to request network coding from a network coding device. The systems and techniques also provide the ability for network coding devices to process a network coding request from a transmitting UE device. As noted above, the sidelink communications may be performed according to 3GPP communication protocols (e.g., using a PC5 sidelink interface according to LTE, 5G, etc.), Wi-Fi direct communication protocols (e.g., DSRC protocol), or using any other device-to-device communication protocol.

In some aspects, a transmitting UE device may signal a request for network coding (referred to as a network coding request) to a network coding device by using a network coding indicator. In some examples, the status of the network coding indicator may be set (e.g., to a value of 1 or 0) to request network coding of a sidelink communication based on one or more parameters associated with the sidelink communication. In some cases, the one or more parameters associated with the sidelink communication may include a priority level (e.g., a packet priority level), one or more packet delay budget (PDB) parameters, a prior transmission count (e.g., number of times data associated with sidelink communication has been transmitted previously), any other parameter or metric, and/or any combination thereof. In some examples, the one or more PDB parameters may include a number of slots, remaining time, expiration time, and/or expiration slot.

In some aspects, a transmitting UE device may request network coding by setting the network coding indicator to a particular value (e.g., a value of 1 or 0) when the priority level associated with the data (e.g., data packet, transport block, etc.) is equal to, greater than, or less than a threshold priority level value. In addition or alternatively, in some examples, a transmitting UE device may request network coding when one or more of the PDB parameter values are equal to, greater than, or less than a remaining PDB threshold value. In addition or alternatively, in some cases, a transmitting UE device may request network coding when the number of times data associated with a sidelink communication has been transmitted is equal to, greater than, or less than a prior transmission count threshold.

In some examples, the network coding request may include network coding request data. In some cases, the network coding request data may include a receiving UE group size, location data associated with the transmitting UE device, one or more PDB parameters, a communication range (e.g., feedback distance) associated with the transmitting UE device, any other parameter or metric, and/or any combination thereof. In some aspects, a network coding device may use the network coding request data to process a network coding request and/or to determine whether to perform network coding. In some examples, a network coding device may implement network coding when a size of receiving UE group size is equal to or above a threshold value. In addition or alternatively, in some cases, the network coding device may use location data associated with the transmitting UE device to determine a distance between the transmitting UE device and the network coding device. In such cases, the network coding device may implement network coding when the distance to the transmitting UE device is less than a threshold value. In addition or alternatively, in some aspects, the network coding device may use one or more PDB parameters to determine whether to perform network coding for a particular data packet or transport block. In addition or alternatively, in some examples, the network coding device may use one or more PDB parameters to prioritize network coding of one data packet relative to another data packet. In addition or alternatively, in some cases, the network coding device may include the communication range associated with the transmitting UE device in a network coded sidelink transmission. In some configurations, a receiving UE device may use the communication range to determine whether the receiving UE device is expected to provide feedback upon receiving and decoding the network coded sidelink transmission.

Additional aspects of the present disclosure are described in more detail below.

As used herein, the term "communication unit" is a system, device, or component of a UE (e.g., a vehicle, a user device, etc.) and/or other device (e.g., a road side unit (RSU) or other device) that may include a telematics control unit (TCU), a network access device (NAD), a modem, a subscriber identity module (SIM), a transceiver (or individual receiver and/or transmitter), any combination thereof, and/or other system, device, or component configured to perform wireless communication operations.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable device (e.g., smart watch, glasses, an extended reality (XR) device such as a virtual reality (VR) headset, an augmented reality (AR) headset or glasses, or a mixed reality (MR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "user device," a "user terminal" or UT, a "client device," a "wireless device," "a wireless communication device," a "subscriber device," a "subscriber terminal," a "subscriber station," a "mobile device," a "mobile terminal," a "mobile station," or variations thereof. Generally, UEs may communicate with a core network via a RAN, and through the core network the UEs may be connected with external networks such as the Internet and with other UEs. UEs may also communicate with other UEs and/or other devices as described herein. In some cases, other mechanisms of connecting to the core network, the Internet, and other UEs are also possible for the UEs, such as over wired access networks, wireless local area network (WLAN) networks (e.g., based on IEEE 802.11, based on ultra-wideband (UWB), etc.), and so on.

A base station may operate according to one of several RATs in communication with UEs, RSUs, and/or other devices, depending on the network in which it is deployed. In some cases, a base station may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs may send signals to a base station is called an uplink (UL) channel (e.g., a reverse traffic channel, a reverse control channel, an access channel, etc.). A communication link through which the base station may send signals to UEs is called a downlink (DL) or forward link channel (e.g., a paging channel, a control channel, a broadcast channel, a forward traffic channel, etc.). As used herein the term traffic channel (TCH) may refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

A road side unit (RSU) is a device that may transmit and receive messages over a communications link or interface (e.g., a cellular-based sidelink or PC5 interface, an 802.11 or WiFi™ based Dedicated Short Range Communication (DSRC) interface, and/or other interface) to and from one or more UEs, other RSUs, and/or base stations. An example of messages that may be transmitted and received by an RSU includes vehicle-to-everything (V2X) messages, which are described in more detail below. RSUs may be located on various transportation infrastructure systems, including roads, bridges, parking lots, toll booths, and/or other infrastructure systems. In some examples, an RSU may facilitate communication between UEs (e.g., vehicles, pedestrian user devices, and/or other UEs) and the transportation infrastructure systems. In some implementations, a RSU may be in communication with a server, base station, and/or other system that may perform centralized management functions.

An RSU may communicate with a communications system of a UE. For example, an intelligent transport system (ITS) of a UE (e.g., a vehicle and/or other UE) may be used to generate and sign messages for transmission to an RSU and to validate messages received from an RSU. An RSU may communicate (e.g., over a PC5 interface, DSRC interface, etc.) with vehicles traveling along a road, bridge, or other infrastructure system in order to obtain traffic-related data (e.g., time, speed, location, etc. of the vehicle). In some cases, in response to obtaining the traffic-related data, the RSU may determine or estimate traffic congestion information (e.g., a start of traffic congestion, an end of traffic congestion, etc.), a travel time, and/or other information for a particular location. In some examples, the RSU may communicate with other RSUs (e.g., over a PC5 interface, DSRC interface, etc.) in order to determine the traffic-related data. The RSU may transmit the information (e.g., traffic congestion information, travel time information, and/or other information) to other vehicles, pedestrian UEs, and/or other UEs. For example, the RSU may broadcast or otherwise transmit the information to any UE (e.g., vehicle, pedestrian UE, etc.) that is in a coverage range of the RSU.

According to various aspects, FIG. 1 illustrates an example of a wireless communications system 100. The wireless communications system 100 (which may also be referred to as a wireless wide area network (WWAN)) may include various base stations 102 and various user equipment devices (UEs) 104. As used herein, the term "UE" may be referred to interchangeably as an "access terminal" or "AT," a "user device," a "user terminal" or UT, a "client device," a "wireless device," a "subscriber device," a "subscriber terminal," a "subscriber station," a "mobile device," a "mobile terminal," a "mobile station," or variations thereof.

The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a 4G/LTE network, or gNBs where the wireless communications system 100 corresponds to a 5G/NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency may be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 (e.g., access links) between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 may include devices (e.g., UEs etc.) that communicate with one or more UEs 104, base stations 102, APs 150, etc. utilizing the ultra-wideband (UWB) spectrum. The UWB spectrum may range from 3.1 to 10.5 GHz.

The small cell base station 102' may operate in a licensed and/or an unlicensed frequency spectrum (e.g., utilizing LTE or NR technology and use the same 5 GHz unlicensed frequency spectrum as used by the WLAN AP 150). The wireless communications system 100 may further include a millimeter wave (mmW) base station 180 that may operate in mmW frequencies and/or near mmW frequencies in communication with a UE 182. In some cases, mmW frequencies may be referred to as the FR2 band (e.g., including a frequency range of 24250 MHz to 52600 MHz). In some examples, the wireless communications system 100 may include one or more base stations (referred to herein as "hybrid base stations") that operate in both the mmW frequencies (and/or near mmW frequencies) and in sub-6 GHz frequencies (referred to as the FR1 band, e.g., including a frequency range of 450 to 6000 MHz). In some examples, the mmW base station 180, one or more hybrid base stations (not shown), and the UE 182 may utilize beamforming (transmit and/or receive) over a mmW communication link 184 to compensate for the extremely high path loss and short range. The wireless communications system 100 may further include a UE 164 that may communicate with a macro cell base station 102 over a communication link 120 and/or the mmW base station 180 over a mmW communication link 184.

In some examples, in order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that may be tuned to band (i.e., carrier frequency) 'X' or band 'Y,' and "Receiver 2" is a one-band receiver tuneable to band 'Z' only.

The wireless communications system 100 may further include one or more UEs, such as UE 190, that connect indirectly to one or more communication networks via one or more relay devices (e.g., UEs) by using device-to-device (D2D) peer-to-peer (P2P) links (referred to as "sidelinks"). In the example of FIG. 1, UE 190 has a D2D P2P link 192 with one of the UEs 104, which may be configured to operate as a relay device (e.g., through which UE 190 may indirectly communicate with base station 102). In another example, UE 190 also has a D2D P2P link 194 with WLAN STA 152, which is connected to the WLAN AP 150 and may be configured to operate as a relay device (e.g., UE 190 may indirectly communicate with AP 150). In an example, the D2D P2P links 192 and 194 may be supported with any well-known D2D RAT, such as LTE Direct (LTE-D), Wi-Fi Direct (Wi-Fi-D), Bluetooth®, UWB, and so on.

Figure 2:
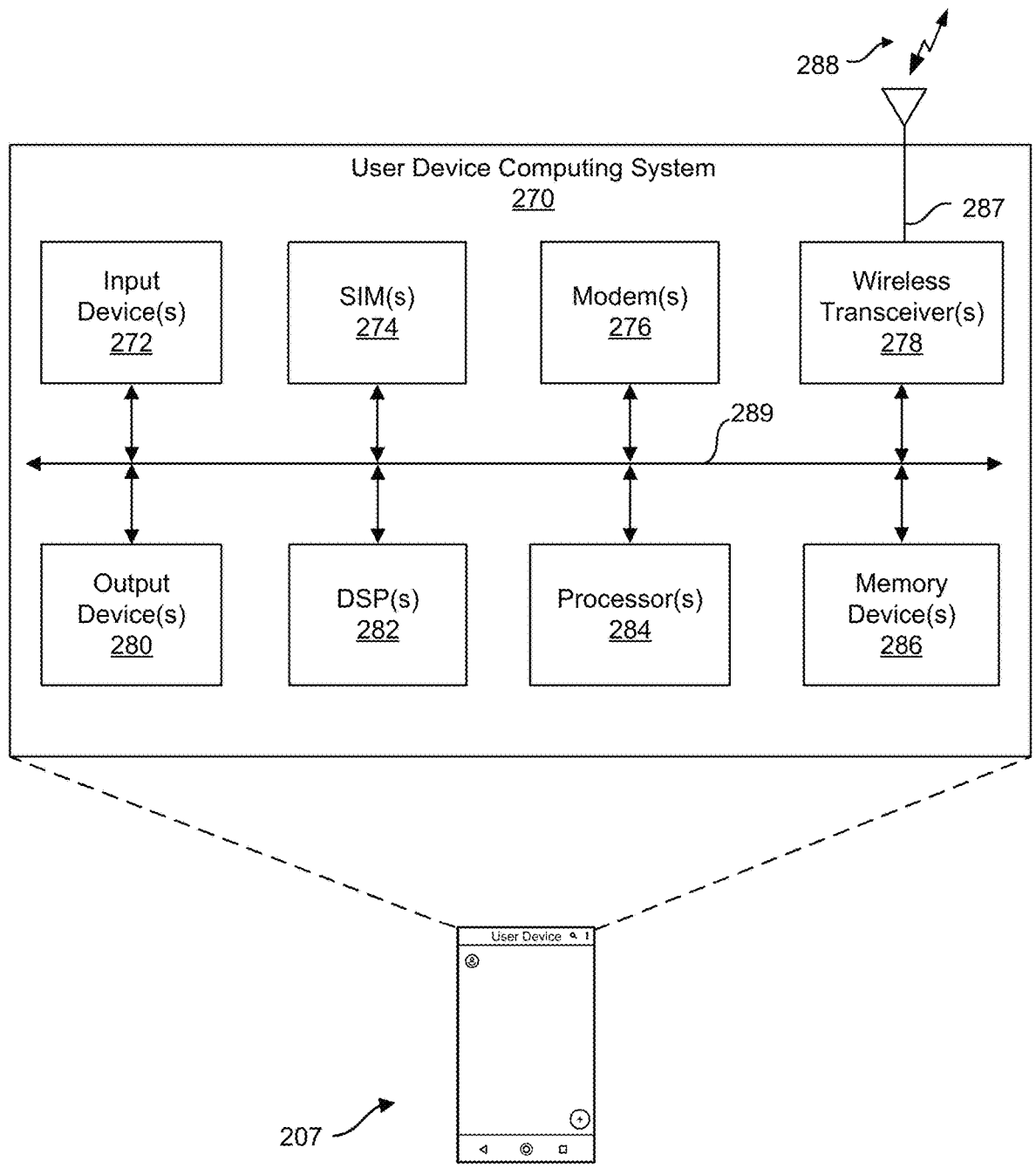
FIG. 2 is a block diagram illustrating an example of a computing system of a wireless device, according to aspects of the disclosure.

FIG. 2 illustrates an example of a computing system 270 of a wireless device 207. The wireless device 207 may include a client device such as a UE (e.g., UE 104, UE 152, UE 190) or other type of device (e.g., a station (STA) configured to communication using a Wi-Fi interface) that may be used by an end-user. Wireless device may also include network devices (e.g., base stations such as eNBs and/or gNBs, Wi-Fi access points (APs) such as routers, range extenders or the like, etc.). For example, the wireless device 207 may include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, base station, access point, and/or another device that is configured to communicate over a wireless communications network. The computing system 270 includes software and hardware components that may be electrically or communicatively coupled via a bus 289 (or may otherwise be in communication, as appropriate). For example, the computing system 270 includes one or more processors 284. The one or more processors 284 may include one or more CPUs, ASICs, FPGAs, APs, GPUs, VPUs, NSPs, microcontrollers, dedicated hardware, any combination thereof, and/or other processing device or system. The bus 289 may be used by the one or more processors 284 to communicate between cores and/or with the one or more memory devices 286.

The computing system 270 may also include one or more memory devices 286, one or more digital signal processors (DSPs) 282, one or more SIMs 274, one or more modems 276, one or more wireless transceivers 278, an antenna 287, one or more input devices 272 (e.g., a camera, a mouse, a keyboard, a touch sensitive screen, a touch pad, a keypad, a microphone, and/or the like), and one or more output devices 280 (e.g., a display, a speaker, a printer, and/or the like).

In some aspects, computing system 270 may include one or more radio frequency (RF) interfaces configured to transmit and/or receive RF signals. In some examples, an RF interface may include components such as modem(s) 276, wireless transceiver(s) 278, and/or antennas 287. The one or more wireless transceivers 278 may transmit and receive wireless signals (e.g., signal 288) via antenna 287 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 270 may include multiple antennas or an antenna array that may facilitate simultaneous transmit and receive functionality. Antenna 287 may be an omnidirectional antenna such that radio frequency (RF) signals may be received from and transmitted in all directions. The wireless signal 288 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 288 may be transmitted directly to other wireless devices using sidelink communications (e.g., using a PC5 interface, using a DSRC interface, etc.). Wireless transceivers 278 may be configured to transmit RF signals for performing sidelink communications via antenna 287 in accordance with one or more transmit power parameters that may be associated with one or more regulation modes. Wireless transceivers 278 may also be configured to receive sidelink communication signals having different signal parameters from other wireless devices.

In some examples, the one or more wireless transceivers 278 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end may generally handle selection and conversion of the wireless signals 288 into a baseband or intermediate frequency and may convert the RF signals to the digital domain.

In some cases, the computing system 270 may include a coding-decoding device (or CODEC) configured to encode and/or decode data transmitted and/or received using the one or more wireless transceivers 278. In some cases, the computing system 270 may include an encryption-decryption device or component configured to encrypt and/or decrypt data (e.g., according to the AES and/or DES standard) transmitted and/or received by the one or more wireless transceivers 278.

The one or more SIMs 274 may each securely store an international mobile subscriber identity (IMSI) number and related key assigned to the user of the wireless device 207. The IMSI and key may be used to identify and authenticate the subscriber when accessing a network provided by a network service provider or operator associated with the one or more SIMs 274. The one or more modems 276 may modulate one or more signals to encode information for transmission using the one or more wireless transceivers 278. The one or more modems 276 may also demodulate signals received by the one or more wireless transceivers 278 in order to decode the transmitted information. In some examples, the one or more modems 276 may include a Wi-Fi modem, a 4G (or LTE) modem, a 2G (or NR) modem, and/or other types of modems. The one or more modems 276 and the one or more wireless transceivers 278 may be used for communicating data for the one or more SIMs 274.

The computing system 270 may also include (and/or be in communication with) one or more non-transitory machine-readable storage media or storage devices (e.g., one or more memory devices 286), which may include, without limitation, local and/or network accessible storage, a disk drive, a drive array, an optical storage device, a solid-state storage device such as a RAM and/or a ROM, which may be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 286 and executed by the one or more processor(s) 284 and/or the one or more DSPs 282. The computing system 270 may also include software elements (e.g., located within the one or more memory devices 286), including, for example, an operating system, device drivers, executable libraries, and/or other code, such as one or more application programs, which may comprise computer programs implementing the functions provided by various embodiments, and/or may be designed to implement methods and/or configure systems, as described herein.

In some aspects, the wireless device 207 may include means for performing operations described herein. The means may include one or more of the components of the computing system 270. For example, the means for performing operations described herein may include one or more of input device(s) 272, SIM(s) 274, modems(s) 276, wireless transceiver(s) 278, output device(s) (280), DSP(s) 282, processors (284), memory device(s) 286, and/or antenna(s) 287.

In some aspects, wireless device 207 may correspond to a user equipment (UE) and may include: means for determining at least one parameter associated with a sidelink communication; means for determining, based on the at least one parameter, a status of a network coding indicator corresponding to the sidelink communication; and means for transmitting the sidelink communication and the network coding indicator including the determined status to at least one network entity configured to perform network coding. In some examples, the means for determining may include the one or more processors 284, the one or more DSPs 282, the one or more wireless transceivers 278, the one or more modems 276, the one or more memory devices 286, any combination thereof, or other component(s) of the wireless device. In some cases, the means for transmitting may include the one or more wireless transceivers 278, the one or more modems 276, the one or more SIMs 274, the one or more processors 284, the one or more DSPs 282, the one or more memory devices 286, any combination thereof, or other component(s) of the wireless device.

In some examples, wireless device 207 may correspond to a network coding device (e.g., a UE, a base station, an RSU, etc.) and may include: means for determining at least one parameter associated with a sidelink communication; means for receiving, from a transmitting user equipment (UE) device, a sidelink communication associated with a request for network coding; means for receiving a set of signaling information associated with the sidelink communication; and means for determining whether to perform network coding of the sidelink communication based on the set of signaling information. In some examples, the means for determining may include the one or more processors 284, the one or more DSPs 282, the one or more wireless transceivers 278, the one or more modems 276, the one or more memory devices 286, any combination thereof, or other component(s) of the wireless device. In some examples, the means for receiving may include the one or more wireless transceivers 278, the one or more modems 276, the one or more SIMs 274, the one or more processors 284, the one or more DSPs 282, the one or more memory devices 286, any combination thereof, or other component(s) of the wireless device.

Figure 3A:
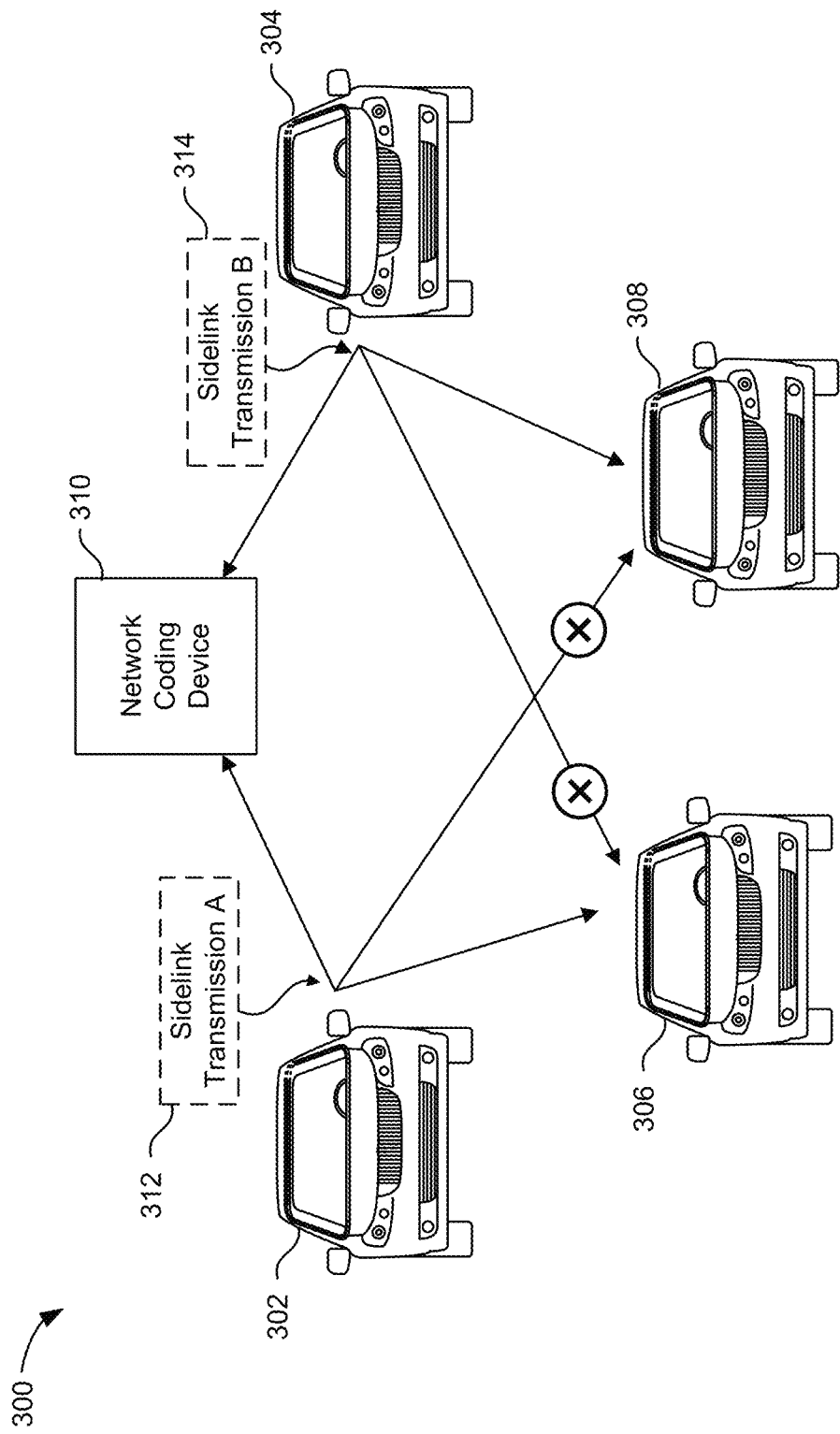
FIG. 3A is a block diagram illustrating an example wireless communications system for implementing signaling for network coding of sidelink communications, according to aspects of the disclosure.

As noted above, systems and techniques are described herein for performing signaling to a network encoder for network coding of device-to-device communications. FIG. 3A illustrates an example of a wireless communications system 300 for implementing signaling for network coding of device to device communications (e.g., PC5 sidelink, DSRC, etc.). In some aspects, system 300 may include one or more vehicles such as vehicle 302, vehicle 304, vehicle 306, and vehicle 308. Although illustrated as vehicles, each of vehicle 302, vehicle 304, vehicle 306, and vehicle 308 may correspond to any type of user equipment (UE) device. As noted above, a UE device may include any wireless communication device (e.g., a mobile phone, router, tablet computer, laptop computer, tracking device, wearable device (e.g., smart watch, glasses, an extended reality (XR) device such as a virtual reality (VR) headset, an augmented reality (AR) headset or glasses, or a mixed reality (MR) headset, etc.), vehicle (e.g., automobile, motorcycle, bicycle, etc.), Internet of Things (IoT) device, etc.) used by a user to communicate over a wireless communications network.

In some examples, system 300 may also include network coding device 310. In some cases, network coding device 310 may correspond to a base station, an RSU, a UE, or any other type wireless communication device. In some aspects, network coding device 310 may be configured to perform network coding of one or more sidelink communications. For instance, network coding device 310 may be configured to provide network coding for sidelink communications made by one or more of vehicle 302, vehicle 304, vehicle 306, and vehicle 308.

In some examples, network coding (e.g., performed by network coding device 310) may be used to combine (e.g., encode) data from two or more transmissions (e.g., data packets, transport blocks, etc.). For example, network coding device 310 may implement network coding to encode sidelink transmission A 312 and sidelink transmission B 314 into a single transmission (as discussed with respect to network coded transmission 316 in FIG. 3B). In some aspects, network coding device 310 may implement network coding by using an exclusive or (XOR) operation to combine transmissions. In some examples, network coding device 310 may implement network coding by using a linear network coding algorithm (e.g., using linear functions). In some cases, a receiver UE device (e.g., vehicle 302, vehicle 304, vehicle 306, and/or vehicle 308) may decode a network coded transmission to extract data corresponding to the two or more encoded transmissions.

In some aspects, network coding may include erasure coding. In some cases, an erasure coded transmission may be used to correct one or more data erasures. For instance, a single parity check code may be used to correct one erasure. In one illustrative example, three inputs corresponding to [a, b, c] may be encoded to [a, b, c, a⊕b⊕c] and then transmitted. In some cases, the received vector may include a single erasure '?' as follows: [a, ?, c, a⊕b⊕c]. In some aspects, the erased element may be recovered by summing the others: a⊕c⊕(a⊕b⊕c)=b. In some instances, recovery of the erasure (e.g., based on erasure coding) may be represented as a linear system (e.g., over a Galois field) having three variables and four linearly independent constraints, as follows:

$$\begin{bmatrix} 1 & 0 & 0 \\ 0 & 1 & 0 \\ 0 & 0 & 1 \\ 1 & 1 & 1 \end{bmatrix} \cdot [a \ b \ c]^T = [a \ b \ c \ a \oplus b \oplus c \ ]^T$$

In some aspects, a maximum distance separable (MDS) erasure code (e.g., Reed-Solomon code) may be used to recover one or more erasures. In some cases, an MDS erasure code may be represented as (n, k) in which data corresponding to k symbols may be encoded into an n symbol code word. In one illustrative examples, MDS erasure coding may be used to recover two erasures as follows:

$$\begin{bmatrix} 1 & 0 & 0 \\ 0 & 1 & 0 \\ 0 & 0 & 1 \\ 1 & 1 & 1 \\ 1 & \alpha & \alpha^2 \end{bmatrix} \cdot [a \ b \ c]^T = [a \ b \ c \ a+b+c \ \alpha+\alpha \cdot b+\alpha^2 \cdot c \ ]^T$$

In some examples, network coding device 310 may implement network coding to increase the capacity of system 300 (e.g., increase number of UEs, increase traffic per UE, etc.). In addition or alternatively, in some cases, network coding device 310 may implement network coding to improve resource utilization of system 300 (e.g., reduce latency, improve throughput, optimize utilization of bandwidth, etc.). For example, network coding may be used to reduce the number of retransmissions performed by one or more UEs (e.g., vehicle 302, vehicle 304, vehicle 306, vehicle 308, and/or other UE) in system 300.

In some aspects, vehicle 302 may transmit (e.g., broadcast, unicast, etc.) sidelink transmission A 312. In some configurations, sidelink transmission A 312 may be received and decoded by vehicle 306 and network coding device 310. As illustrated by the "X" symbol in FIG. 3A, vehicle 308 may fail to receive and/or decode sidelink transmission A 312. In some examples, vehicle 304 may transmit (e.g., unicast, groupcast, broadcast) sidelink transmission B 314. In some configurations, sidelink transmission B 314 may be received and decoded by vehicle 308 and network coding device 310. As illustrated by the "X" symbol in FIG. 3A, vehicle 306 may fail to receive and/or decode sidelink transmission B 314.

In some examples, vehicle 302 may signal a request for network coding of sidelink transmission A 312 to network coding device 310. In some cases, vehicle 304 may also signal a request for network coding of sidelink transmission B 314 to network coding device 310. In some aspects, a request for network coding may be signaled (e.g., by vehicle 302 and/or vehicle 304) using a network coding request and/or a network coding indicator (e.g., a network coding indicator included in a network coding request). In some cases, the network coding indicator may correspond to one or more bits of data that are included with a sidelink transmission (e.g., sidelink transmission A 312 or sidelink transmission B 314). In some aspects, the network coding indicator may be sent in a separate sidelink transmission to network coding device 310. In some examples, signaling of the network coding indicator and/or the network coding request may correspond to sidelink control information (SCI), a medium access control (MAC) control element (CE), a PC5 radio resource control (RRC) signal, any other type of signal or channel, and/or any combination thereof.

In some aspects, vehicle 302 may signal a request for network coding of sidelink transmission A 312 based on one or more parameters associated with sidelink transmission A 312. In some cases, vehicle 304 may signal a request for network coding of sidelink transmission B 314 based on one or more parameters associated with sidelink transmission B 314. In some examples, the one or more parameters may include a priority level that is associated with the sidelink transmission (e.g., sidelink transmission A 312 and/or sidelink transmission B 314). In some aspects, the priority level may be based on a Quality of Service Class Identifier (QCI) associated with the sidelink transmission.

In some configurations, vehicle 302 and/or vehicle 304 may signal a request for network coding (e.g., set the network coding indicator) based on the priority level of the sidelink transmission being above or below a threshold priority level value. In some cases, the priority level can correspond to a ProSe Per-Packet Priority (PPPP) for 4G LTE and/or 5G NR (e.g., defined in clause 5.4.6.1 of 3GPP technical specification (TS) 23.303). In some examples, the priority level for a given data unit (e.g., protocol data unit or PDU) can be determined by a UE (e.g., vehicle 302 and/or vehicle 304). In one illustrative example, packet priority level may include 8 levels, with lower priority level values (e.g., priority levels of 1, 2, 3, etc.) being for higher-priority traffic than higher priority level values (e.g., priority levels of 4, 5, 6, and so on). In one illustrative example, the vehicle 302 may request network coding of sidelink transmission A 312 when the priority level is above a threshold of 3 for high-priority traffic (e.g., a priority level of 1, 2, or 3). In another example, vehicle 304 may request network coding of sidelink transmission B 314 when the priority level is below a threshold of 4 for low-priority traffic (e.g., a priority level of 4-8). In some aspects, the threshold priority level for requesting network coding may be indicated and/or configured by network coding device 310. In some cases, the threshold priority level for requesting network coding may be configured according to network traffic congestion (e.g., amount of data traffic, number of UEs, etc.). In one illustrative example, the priority level threshold can be set to a higher value when there is a larger amount of traffic (e.g., to lower the number of retransmissions even further for high traffic scenarios). Those skilled in the art will understand that the threshold priority levels set forth herein are provided as example configurations and that the disclosed systems and techniques are not limited thereto.

In some aspects, the one or more parameters for determining a request for network coding may include a packet delay budget (PDB) parameter. For example, vehicle 302 may signal a request for network coding of sidelink transmission A 312 to network coding device 310 based on a PDB parameter (in addition to or as an alternative to using the priority level and/or other parameters described herein). In some examples, the PDB parameter may include a remaining PDB threshold corresponding to a number of slots, a remaining time, an expiration time, an expiration slot, any other PDB metric, and/or any combination thereof. For instance, vehicle 302 may determine that the PDB parameter for sidelink transmission A 312 corresponds to an expiration time threshold indicating a time that a data packet or data unit may be delayed between a transmitting UE and a receiving device (e.g., a receiving UE, a network entity such as a base station, etc.). In one illustrative example, vehicle 302 may determine the amount of time remaining until the expiration time for sidelink transmission A 312 and may request network coding when the time remaining is greater than or equal to the expiration time threshold (e.g., greater than 30 ms remaining until expiration time).

In some aspects, the one or more parameters for determining a request for network coding may include a number of times the data associated with the sidelink transmission (e.g., data packet or data unit, transport block, etc.) has been transmitted. For example, vehicle 302 may signal a request for network coding of sidelink transmission A 312 to network coding device 310 based on a prior transmission count (in addition to or as an alternative to using the priority level, the PDB parameter, and/or other parameters described herein). In some aspects, vehicle 302 may signal a request for network coding of sidelink transmission A 312 when the number of prior transmissions meets a prior transmission count threshold. In one illustrative example, vehicle 302 may determine that data associated with sidelink transmission A 312 has been previously transmitted 3 times and may request network coding for sidelink transmission A 312 based on the prior transmission count threshold greater than or equal to 3.

Figure 3B:
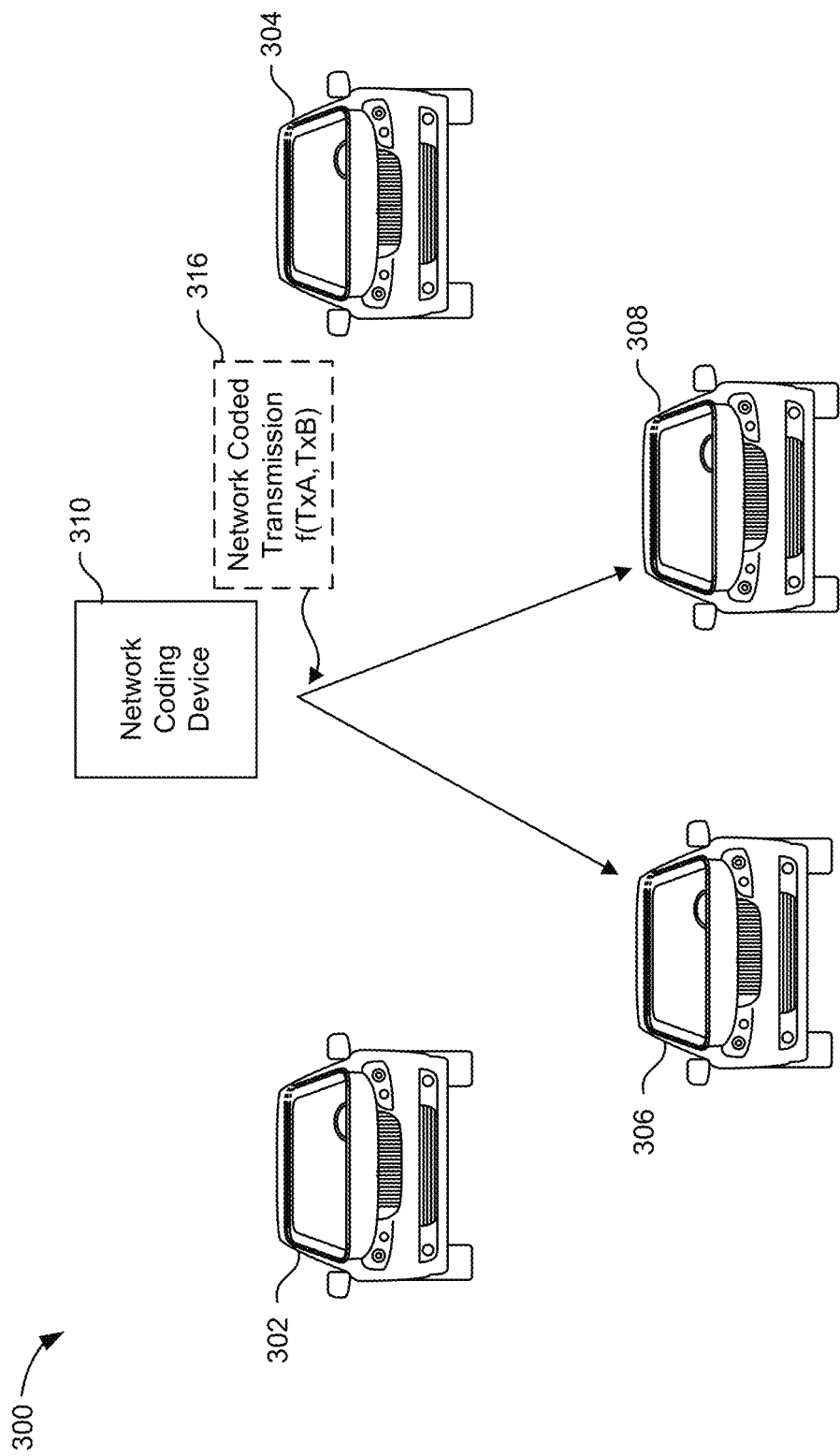
FIG. 3B is a block diagram illustrating an example wireless communications system for implementing signaling for network coding of sidelink communications, according to aspects of the disclosure.

FIG. 3B illustrates a further example of a wireless communications system 300 for implementing signaling for network coding of device to device communications (e.g., PC5 sidelink, DSRC, etc.). As noted with respect to FIG. 3A, system 300 in FIG. 3B includes vehicle 302, vehicle 304, vehicle 306, and vehicle 308. In some cases, system 300 may also include network coding device 310 that may be configured to perform network coding of one or more sidelink communications. In some aspects, network coding device 310 may be configured to transmit network coded transmission 316. In some examples, network coded transmission 316 may correspond to network coding of data (e.g., data packets, data units, transport blocks, etc.) associated with sidelink transmission A 312 and sidelink transmission B 314 (as illustrated in FIG. 3A). As noted above, network coded transmission 316 may be generated using an exclusive OR function, a linear function, erasure coding (e.g., maximum distance separable (MDS) erasure code, Reed-Solomon codes), and/or any other suitable network coding algorithm.

In some examples, network coding device 310 may perform network coding based on a network coding request (e.g., network coding indicator) received from vehicle 302 and/or vehicle 304. In some cases, network coding device 310 may receive feedback associated with sidelink transmission A 312 and/or sidelink transmission B 314. For example, network coding device 310 may receive a negative acknowledgement (e.g., NACK) from vehicle 308 that corresponds to failed reception of sidelink transmission A 312 by vehicle 308. Similarly, network coding device 310 may receive a NACK from vehicle 306 that corresponds to failed reception of sidelink transmission B 314 by vehicle 306. In some aspects, network coding device 310 may perform network coding for sidelink transmission A 312 and/or sidelink transmission B 314 based on a corresponding network coding indicator (e.g., received from vehicle 302 and/or vehicle 304) and a corresponding NACK from a receiving UE device (e.g., vehicle 306 and/or vehicle 308). As shown in FIG. 3B, the network coding device 310 may transmit the network coded transmission 316 to the vehicle 306 and the vehicle 308.

In some examples, the signaling of the request for network coding (e.g., network coding indicator) may include or be associated with network coding request data. In some aspects, the network coding request data may include a receiving UE group size. For instance, vehicle 302, vehicle 306, and vehicle 308 may be part of a group or platoon configured to provide hybrid automatic repeat request (HARQ) feedback for sidelink transmissions (e.g., Groupcast Feedback Option 2). In some aspects, vehicle 302 may determine that the receiving UE group size for sidelink transmission A 312 is two (e.g., vehicle 306 and vehicle 308). In some examples, vehicle 304 may determine that the receiving UE group size for sidelink transmission B 314 is two (e.g., vehicle 306 and vehicle 308). In some cases, vehicle 302 and/or vehicle 304 may include the receiving UE group size in the network coding request data that may accompany the network coding request sent to network coding device 310.

In some aspects, network coding device 310 may use the receiving UE group size to determine whether to perform network coding for a sidelink transmission. For example, network coding device 310 may determine not to perform network coding when the receiving UE group size is small (e.g., less than 3 UEs). In another example, network coding device 310 may determine to perform network coding when the receiving UE group size is large (e.g., greater than 5 UEs). In some aspects, the number of the receiving UE group size used to determine whether to perform network coding may be dynamically configured (e.g., based on network load and/or other parameter or metric).

In some examples, network coding device 310 may use the receiving UE group size to determine expected feedback. For example, network coding device 310 may expect to receive feedback (e.g., acknowledgement (ACK) or negative acknowledgment (NACK)) associated with sidelink transmission A 312 from vehicle 306 and vehicle 308. In another example, network coding device 310 may expect to receive feedback (e.g., ACK or NACK) associated with sidelink transmission B 314 from vehicle 306 and vehicle 308. In some aspects, network coding device 310 may use the receiving UE group size to determine expected feedback for network coded transmission 316 (e.g., network coded transmission corresponding to sidelink transmission A 312 and sidelink transmission B 314).

In some aspects, the network coding request data that may be included with the request for network coding may include location data associated with the transmitting UE device. For example, vehicle 302 may signal location data (e.g., geographic coordinates, zone identification, etc.) to network coding device 310 (in addition to or as an alternative to the receiving UE group size and/or any other network coding request data described herein). In some cases, network coding device 310 may use the location data associated with the transmitting UE device (e.g., vehicle 302) to determine a distance between the network coding device 310 and the transmitting UE device. In some examples, network coding device may determine whether to perform network coding for a sidelink transmission based on a threshold distance between network coding device 310 and the transmitting UE device. For example, network coding device 310 may determine not to perform network coding for sidelink transmission from vehicle 302 when the distance between network coding device 310 and vehicle 302 is greater than a threshold distance value (e.g., greater than 100 meters).

In some examples, network coding device 310 may use the location data received from a transmitting UE device (e.g., vehicle 302 and/or vehicle 304) to determine a number of receiving UEs that are within range of the transmitting UE device (e.g., receiving UE group size). For example, network coding device 310 may use the location of vehicle 302 to determine that vehicle 302 is within range of vehicle 304, vehicle 306, and vehicle 308. As noted above, network coding device 310 may use the receiving UE group size to determine whether to perform network coding.

In some cases, network coding device 310 may include the location data in a network coded transmission (e.g., network coded transmission 316). In some aspects, receiving UEs that receive a network coded message (e.g., network coded transmission 316) may use location data to determine whether the receiving UE device is within a threshold range for providing feedback. For example, vehicle 306 may use location data included with network coded transmission 316 to determine a distance between vehicle 306 and vehicle 304. In one illustrative example, vehicle 306 may determine (e.g., based on location data) that a distance to vehicle 304 is greater than threshold distance value (e.g., greater than 150 meters). Based on the determination that distance to a transmitting UE device (e.g., vehicle 304) is greater than a threshold distance value, vehicle 304 may not provide feedback (e.g., NACK or ACK) to network coded transmission 316.

In some examples, the network coding request data that may be included with the request for network coding may include a packet delay budget (PDB) parameter. For example, vehicle 302 may signal one or more PDB parameters (e.g., number of slots, remaining time, expiration time, expiration slot, etc.) to network coding device 310 (in addition to or as an alternative to the receiving UE group size, the location data, and/or any other network coding request data described herein). In some examples, network coding device may determine whether to perform network coding for a sidelink transmission based on one or more of the PDB parameters. For example, network coding device 310 may determine not to perform network coding when a PDB parameter associated with sidelink transmission A 312 is above or below a threshold value. In one illustrative example, network coding device 310 may determine not to perform network coding when an expiration time associated with sidelink transmission A 312 is less than 50 ms from the time sidelink transmission A 312 was received by network coding device 310. In some cases, network coding device 310 may use one or more PDB parameters to determine a transmission priority for a network coded transmission. For example, network coding device 310 may prioritize network coding of sidelink transmission A 312 over sidelink transmission B 314 when sidelink transmission A 312 is associated with a lower expiration time (e.g., the foregoing example assumes that sidelink transmission A 312 is not encoded with sidelink transmission B 314).

In some aspects, the network coding request data that may be included with the request for network coding may include a communication range associated with the transmitting UE device. For example, vehicle 302 may signal a communication range (e.g., feedback distance in which a receiving UE device sends feedback to transmitting UE device) to network coding device 310 (in addition to or as an alternative to the receiving UE group size, the location data, the PDB parameter(s) and/or any other network coding request data described herein). In some examples, network coding device 310 may include the communication range in network coded transmission 316. In one illustrative example, the communication range may correspond to a distance of 100 meters and vehicle 306 and/or vehicle 308 may determine not send any feedback when the distance from vehicle 306 and/or vehicle 308 to a respective transmitting UE device (e.g., vehicle 302 and/or vehicle 304) is greater than 100 meters.

Figure 4:
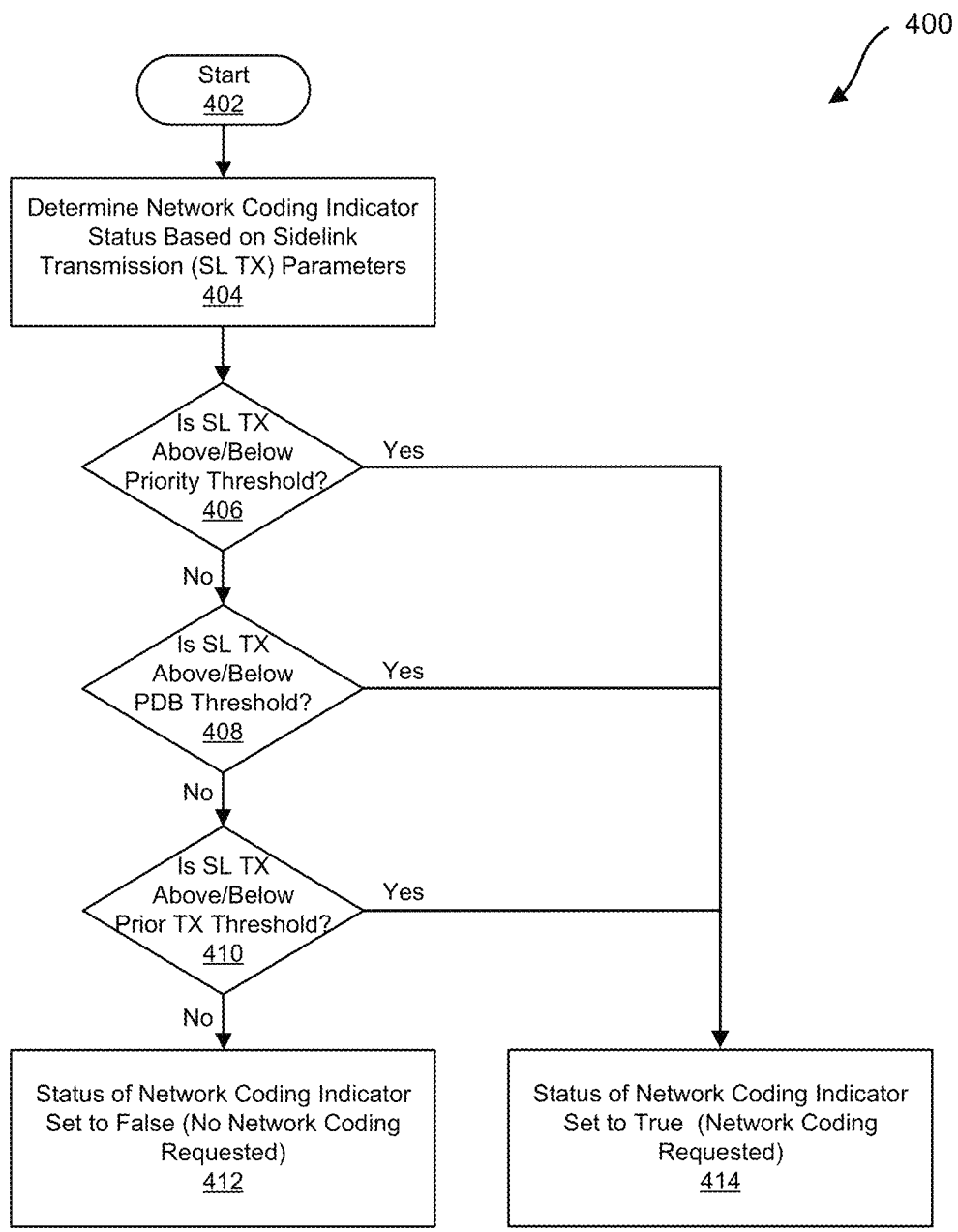
FIG. 4 is a flow diagram illustrating an example of a process that may be performed by a transmitting user equipment (UE) device for signaling for network coding of sidelink communications, according to aspects of the disclosure.

FIG. 4 is a flowchart diagram illustrating an example of a process 400 for signaling a network coding request of a sidelink communication. In some examples, process 400 may be performed by a transmitting user equipment (UE) device such as vehicle 302 and/or vehicle 304. The process 400 may begin at block 402 which may include a UE device booting up and/or initiating operations relating to sidelink communications (e.g., preparing to send a sidelink transmission). At block 404, the process 400 may include determining a network coding indicator status based on one or more parameters associated with a sidelink transmission. In some aspects, the network coding indicator status may be used to request network coding from a network coding device. In some examples, the one or more parameters associated with the sidelink transmission may include a priority level associated with the sidelink communication, a packet delay budget (PDB) parameter associated with the sidelink communication, a number of times the sidelink communication has been transmitted, any other suitable parameter/metric associated with the sidelink transmission, and/or any combination thereof.

At block 406, the process 400 may include determining whether the sidelink transmission is associated with a priority level that is above or below a threshold priority level. In some aspects, a UE device may request network coding for a sidelink transmission that is associated with data (e.g., packet, transport block, etc.) having a relatively high priority level (e.g., a priority level of 1, 2, or 3 on an exemplary scale having 8 levels). In some cases, a UE device may request network coding for a sidelink transmission that is associated with data having a relatively low priority level (e.g., a priority level of 6, 7, or 8 on an exemplary scale having 8 levels). In some cases, if the priority level associated with the sidelink transmission satisfies a threshold priority level, the process may proceed to block 414 and set the status of a network coding indicator to 'True' (e.g., request network coding). In some examples, if the priority level associated with the sidelink transmission does not satisfy a threshold priority level, the process 400 may proceed to block 408.

At block 408, the process 400 may include determining whether one or more PDB parameters associated with the sidelink transmission are above or below a remaining PDB threshold. In some examples, the PDB parameters may include a number of slots, a remaining time, an expiration time, an expiration slot, any other PDB metric, and/or any combination thereof. In some cases, a UE device may request network coding for a sidelink transmission that is associated with a PDB parameter that is above or below a remaining PDB threshold. For example, network coding may be requested when a remaining time to transmit the sidelink transmission is greater than a threshold value. In another example, network coding may not be requested when a number of slots associated with the sidelink transmission is less than a threshold value. In some cases, if the PDB parameter associated with the sidelink transmission satisfies a PDB threshold, the process may proceed to block 414 and set the status of a network coding indicator to 'True' (e.g., request network coding). In some examples, if the PDB parameter associated with the sidelink transmission does not satisfy a PDB threshold, the process 400 may proceed to block 410.

At block 410, the process 400 may include determining whether a prior transmission count corresponding to the data associated with the sidelink transmission is above or below a prior transmission count threshold. In some cases, a UE device may request network coding when the number of prior transmissions is greater than or equal to a prior transmission threshold. For example, a UE device may request network coding after receiving 3 or more NACKs for sidelink transmissions that are associated with a data packet, a data unit, a transport block, etc. In some examples, a UE device may request network coding when the number of prior transmissions is less than or equal to a prior transmission count threshold. For example, a UE device may request network coding when a transmission count threshold is less than 3. In some cases, if the prior transmission count associated with the sidelink transmission satisfies a prior transmission count threshold, the process may proceed to block 414 and set the status of a network coding indicator to 'True' (e.g., request network coding). In some examples, if the prior transmission count associated with the sidelink transmission does not satisfy a prior transmission count threshold, the process 400 may proceed to block 412 and set the status of the network coding indicator to 'False' (e.g., no network coding is requested).

Figure 5:
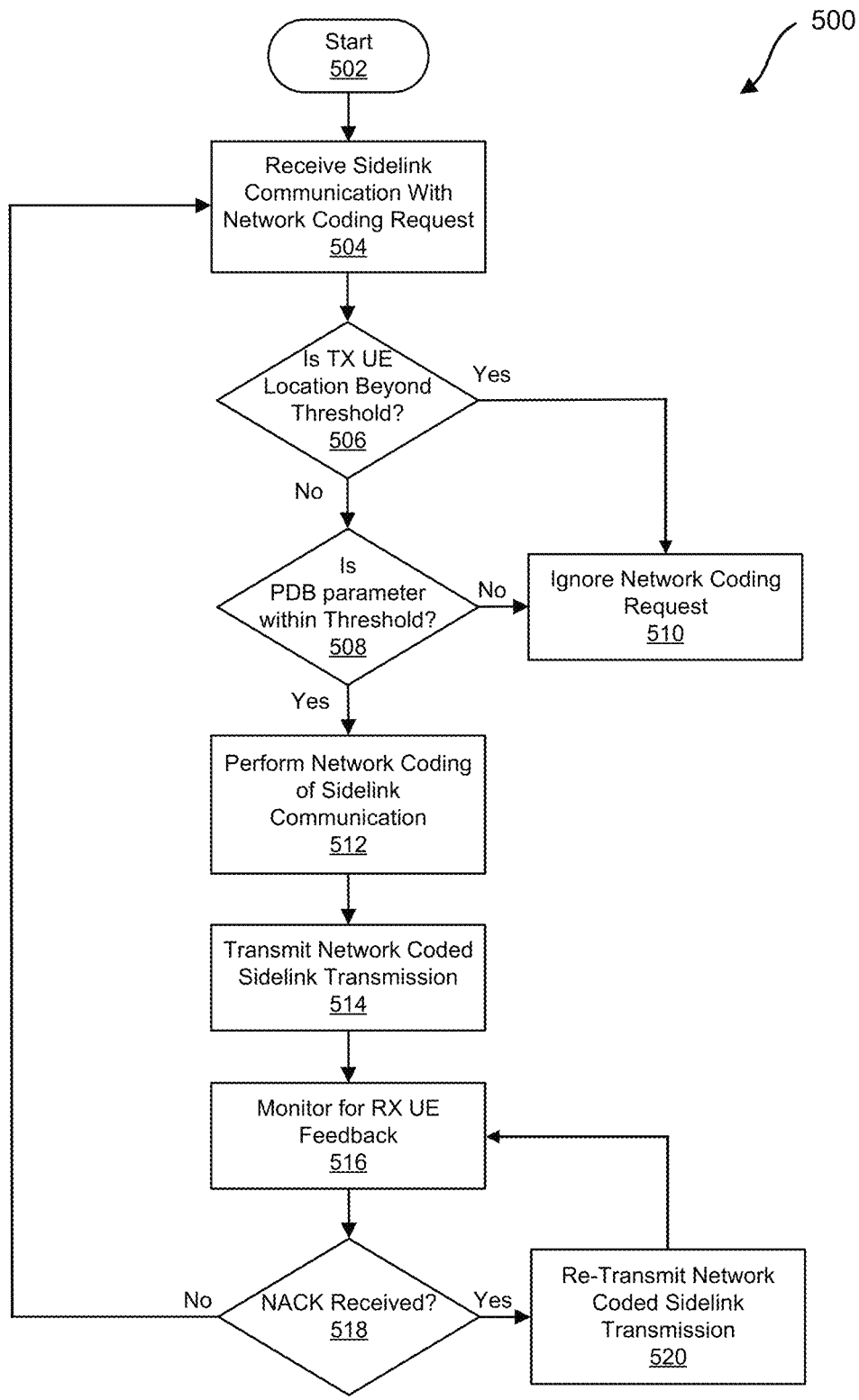
FIG. 5 is a flow diagram illustrating an example of a process that may be performed by a network coding device for implementing network coding of sidelink communications, according to aspects of the disclosure.

FIG. 5 is a flowchart diagram illustrating an example of a process 500 for processing a network coding request of a sidelink communication. In some examples, process 500 may be performed by a network coding device such as network coding device 310. In some aspects, a network coding device may include a base station, a road side unit, a UE device, and/or any other wireless communication device.

The process 500 may begin at block 502 which may include a network coding device booting up and/or initiating operations relating to sidelink communications (e.g., preparing to monitor sidelink communications and/or perform network coding for sidelink communications). At block 504, the process 500 may include receiving a sidelink communication with a network coding request. In some aspects, a network coding request may be signaled by a transmitting UE device by using a network coding indicator. In some examples, the network coding indicator may be received together in a single sidelink communication or in one or more other sidelink communications. In some cases, signaling of the network coding indicator may correspond to sidelink control information (SCI), a medium access control (MAC) control element (CE), a PC5 radio resource control (RRC) signal, any other signal or control channel, and/or any combination thereof. In some aspects, the network coding request may include network coding request data. In some examples, the network coding request data may include a receiving UE group size, location data associated with the transmitting UE device, one or more PDB parameters, a communication range associated with the transmitting UE device, any other network coding request parameter or metric, and/or any combination thereof.

At block 506, the process 500 may include determining whether the transmitting UE device location is beyond a threshold distance from the network coding device. In some aspects, a network coding device may use location information received from the transmitting UE device to determine a distance between the transmitting UE device and the network coding device. In some examples, if the distance between the transmitting UE device and the network coding device is greater than a threshold distance, the process 500 may proceed to block 510 and the network coding device may ignore the network coding request. In one illustrative example, if the transmitting UE device is greater than 100 meters from the network coding device, the network coding device may determine that the transmitting UE device is too far and ignore the network coding request. In some aspects, if the distance between the network coding device and the transmitting UE device is within a threshold distance (e.g., less than 100 meters), the process 500 may proceed to block 508.

At block 508, the process 500 may include determining whether a packet delay budget (PDB) parameter associated with the sidelink communication is within a PDB parameter threshold. In some examples, the PDB parameters may include a number of slots, a remaining time, an expiration time, an expiration slot, any other PDB metric, and/or any combination thereof. In some aspects, a network coding device may determine that a PDB parameter is not within a PDB parameter threshold. For example, a network coding device may determine that the sidelink communication may not be transmitted in accordance with the expiration slot. In some examples, if the PDB parameter is greater than a threshold value, the process 500 may proceed to block 510 and the network coding device may ignore the network coding request. In some cases, if the PDB parameter is within a PDB threshold value, the process 500 may proceed to block 512.

At block 512, the process 500 may include performing network coding of the sidelink communication. In some examples, network coding may be performed using an exclusive OR function, a linear function, erasure coding (e.g., maximum distance separable (MDS) erasure code, Reed-Solomon codes), and/or any other suitable network coding algorithm. In some aspects, a network coding device may use one or more PDB parameters to prioritize network coding of one or more sidelink communications. For example, a network coding device may prioritize network coding of a transport block that is near a corresponding expiration time.

At block 514, the process 500 may include transmitting the network coded sidelink transmission. In some aspects, one or more receiving UE devices may use the network coded sidelink transmission to decode and extract one or more encoded data components. In some examples, the network coded sidelink transmission may include location data corresponding to the transmitting UE device. In some cases, a receiving UE device may use the location data to determine whether the receiving UE device is within a range for responding (e.g., providing feedback) to the network coded sidelink transmission. In some cases, the network coded sidelink transmission may include a communication range (e.g., feedback distance) associated with the transmitting UE device. In some configurations, a receiving UE device may use the communication range to determine whether the receiving UE device is within a range for responding to the network coded sidelink transmission.

At block 516, the process 500 may include monitoring for feedback from receiving UE devices. In some examples, a receiving UE device that successfully decodes the network coded sidelink transmission may not provide any feedback to the network coding device (e.g., receiving UE device does not send an ACK). In some examples, a receiving UE device that successfully decodes the network coded sidelink transmission may provide feedback indicating that the network coded sidelink transmission was decoded. For example, a receiving UE device may be configured as part of a group or platoon implementing a groupcast feedback mechanism (e.g., groupcast feedback option 2) in which receiving UE devices provide hybrid automatic repeat request (HARQ) feedback for sidelink transmissions. In some aspects, a receiving UE device that fails to decode the network coded sidelink transmission may provide feedback indicating that the network coded sidelink transmission was not decoded (e.g., NACK).

At block 518, the process 500 may include determining whether one or more NACK messages were received as feedback corresponding to the network coded sidelink transmission. In some aspects, if the network coding device does not receive any NACK messages, the process 500 may return to block 504 (e.g., receive sidelink communication with network coding request). In some examples, if the network coding device receives a NACK, the process 500 may proceed to block 520 and re-transmit the network coded sidelink transmission. In some cases, the process 500 may repeat the operations of blocks 516, 518, and 520 (e.g., continue re-transmission) until no further NACK messages are received. In some examples, a network coding device may implement a limit on the number of times a sidelink transmission may be retransmitted. In one illustrative example, a network coding device may not retransmit a sidelink transmission more than 5 times. In some aspects, retransmission of the network coded sidelink transmission may be done based on a threshold number of NACK responses. In some cases, retransmission of the network coded sidelink transmission may be based on a percentage of receiving UE devices sending a NACK response. For instance, retransmission of the network coded sidelink transmission may be performed if 50% of the receiving UE devices provide a NACK response.

Figure 6:
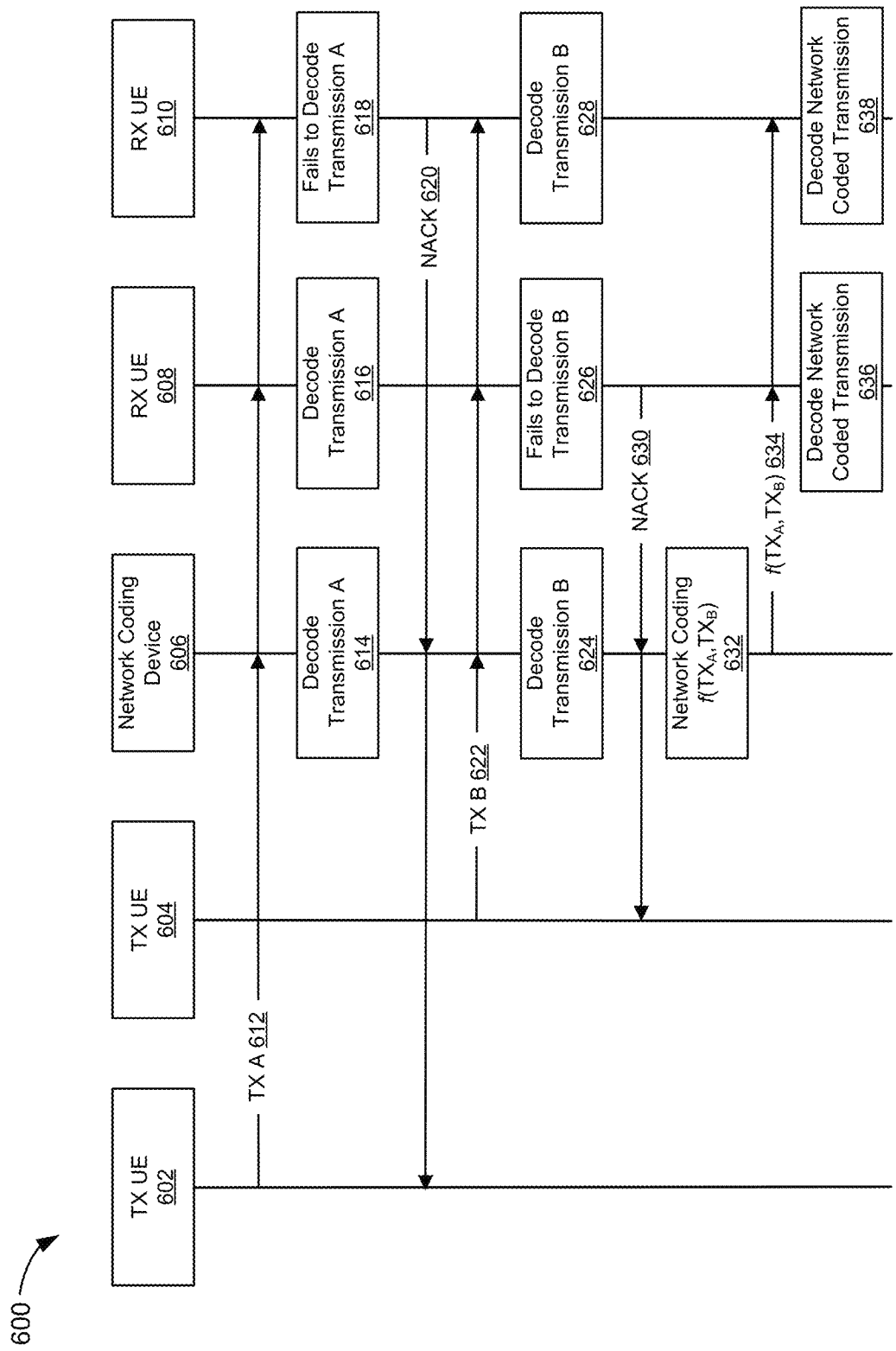
FIG. 6 is a sequence diagram illustrating an example of a sequence for signaling for network coding of sidelink communications, according to aspects of the disclosure.

FIG. 6 is a sequence diagram illustrating an example sequence 600 for performing signaling for network coding of sidelink communications. The sequence 600 may be performed by a TX UE 602, a TX UE 604, a network coding device 606, a RX UE 608 and a RX UE 610. At action 612, TX UE 602 may send a sidelink transmission A to RX UE 608 and RX UE 610. In some aspects, sidelink transmission A may also be received by network coding device 606. In some examples, sidelink transmission A may include a network coding request (e.g., based on a status of a network coding indicator). In some aspects, sidelink transmission A may also include network coding request data (e.g., receiving UE group size, location data associated with the transmitting UE device, one or more PDB parameters, a communication range associated with the transmitting UE device, etc.).

At action 614, network coding device 606 may decode sidelink transmission A. In some aspects, decoding sidelink transmission A may include processing signaling information associated with a network coding request (e.g., network coding indicator, network coding request data, etc.). At action 616, RX UE 608 may decode sidelink transmission A. In some examples, RX UE 608 may not send feedback indicating that sidelink transmission A was successfully decoded (e.g., does not send ACK). At action 618, RX UE 610 may fail to decode sidelink transmission A. At action 620, RX UE 610 may send feedback (e.g., NACK) indicating that RX UE 610 failed to decode sidelink transmission A. In some cases, the NACK from RX UE 610 may be received by TX UE 602 and network coding device 606.

At action 622, TX UE 604 may send a sidelink transmission B to RX UE 608 and RX UE 610. In some aspects, sidelink transmission B may also be received by network coding device 606. In some examples, sidelink transmission B may include a network coding request (e.g., based on a status of a network coding indicator). In some aspects, sidelink transmission B may include network coding request data (e.g., receiving UE group size, location data associated with the transmitting UE device, one or more PDB parameters, a communication range associated with the transmitting UE device, etc.).

At action 624, network coding device 606 may decode sidelink transmission B. In some aspects, decoding sidelink transmission B may include processing signaling information associated with a network coding request (e.g., network coding indicator, network coding request data, etc.). At action 626, RX UE 608 may fail to decode sidelink transmission B. At action 628, RX UE 610 may decode sidelink transmission B. At action 630, RX UE 608 may send feedback (e.g., NACK) indicating that RX UE 608 failed to decode sidelink transmission B. In some cases, the NACK from RX UE 608 may be received by TX UE 604 and network coding device 606.

At action 632, network coding device 606 may perform network coding of sidelink transmission A and sidelink transmission B. In some examples, network coding may be used to combine data (e.g., data packets, data units, transport blocks, etc.) from sidelink transmission A and sidelink transmission B (e.g., network coded sidelink transmission may be denoted as $f(TX_A, TX_B)$). In some aspects, network coding may be implemented using an exclusive OR function, a linear function, erasure coding (e.g., maximum distance separable (MDS) erasure code, Reed-Solomon codes), and/or any other suitable network coding algorithm.

At action 634, network coding device 606 may send the network coded sidelink transmission $f(TX_A, TX_B)$ to RX UE 608 and RX UE 610. In some examples, the network coded sidelink transmission may include location data associated with a transmitting UE device (e.g., TX UE 602 and/or TX UE 604). In some aspects, the network coded sidelink transmission may include a communication range associated with a transmitting UE device (e.g., TX UE 602 and/or TX UE 604).

At action 636, RX UE 608 may decode the network coded sidelink transmission $f(TX_A, TX_B)$. In some examples, RX UE 608 may implement an erasure coding algorithm to determine or extract data associated with sidelink transmission B (e.g., failed to decode at action 626) by using data associated with sidelink transmission A (e.g., decoded at action 616). At action 638, RX UE 610 may decode the network coded sidelink transmission $f(TX_A, TX_B)$. In some examples, RX UE 610 may implement an erasure coding algorithm to determine or extract data associated with sidelink transmission A (e.g., failed to decode at action 618) by using data associated with sidelink transmission B (e.g., decoded at action 628).

Figure 7:
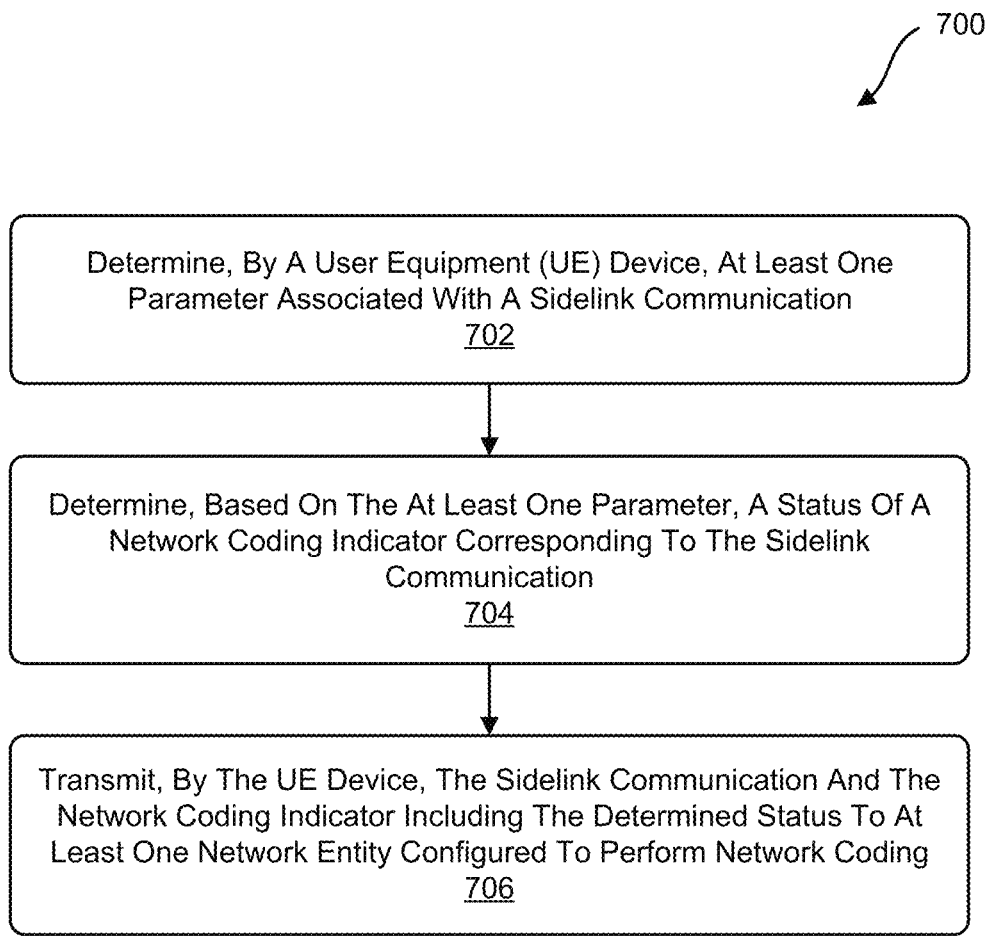
FIG. 7 is a flow diagram illustrating an example of a process for signaling for network coding of sidelink communications, according to aspects of the disclosure.

FIG. 7 is a flowchart diagram illustrating an example of a process 700 for signaling for network coding of sidelink communications. At block 702, the process 700 may include determining, by a user equipment (UE) device, at least one parameter associated with a sidelink communication. For example, vehicle 302 may determine at least one parameter associated with sidelink transmission A 312 and/or vehicle 304 may determine at least one parameter associated with sidelink transmission B 314.

In some examples, the at least one parameter may include a priority level associated with the sidelink communication. For instance, vehicle 302 may determine a priority level that is associated with sidelink transmission A 312 (e.g., with a data packet, data unit, transport block, etc. that is associated with sidelink transmission A 312). In some cases, the priority level may correspond to a ProSe Per-Packet Priority for 4G LTE and/or 5G NR communications.

In some aspects, the at least one parameter may include at least one packet delay budget (PDB) parameter associated with the sidelink communication. For example, vehicle 302 may determine at least one PDB parameter that is associated with sidelink transmission A 312. In some cases, the PDB parameter may include a remaining PDB threshold corresponding to a number of slots, a remaining time, an expiration time, an expiration slot, any other PDB metric, and/or any combination thereof. In some examples, the process 700 may include transmitting the at least one PDB parameter associated with the sidelink communication to the at least one network entity. For instance, vehicle 302 may transmit at least one PDB parameter that is associated with sidelink transmission A 312 to network coding device 310.

In some configurations, the at least one parameter may include a number of times that a data packet associated with the sidelink communication has been transmitted. For instance, vehicle 302 may determine the number of times that a data packet (e.g., data unit, protocol data unit, transport block, and/or any other data type) that is associated with sidelink transmission A 312 has been previously transmitted.

At block 704, the process 700 may include determining, based on the at least one parameter, a status of a network coding indicator corresponding to the sidelink communication. In some examples, the network coding indicator may be used to signal a request for network coding (e.g., a network coding request) to a network coding device. In some cases, the network coding indicator may correspond to one or more bits of data (e.g., a value of 1 or 0) that are included with a sidelink transmission. For instance, vehicle 302 may signal a network coding request to network coding device 310 by using a network coding indicator that is included with sidelink transmission A 312. In some configurations, the network coding indicator may be sent in a separate sidelink transmission. In some examples, the network coding indicator may correspond to at least one of sidelink control information (SCI), a medium access control (MAC) control element (CE), and a PC5 radio resource control (RRC) signal.

At block 706, the process 700 may include transmitting, by the UE device, the sidelink transmission and the network coding indicator including the determined status to at least one network entity configured to perform network coding. For example, vehicle 302 may transmit sidelink transmission A 312 and a network coding indicator to network coding device 310. In some examples, the process 700 may include transmitting location data associated with the UE device to the at least one network entity. For instance, vehicle 302 may transmit location data (e.g., geographic coordinates, zone identification, etc.) to network coding device 310. In some aspects, the process 700 may include transmitting a communication range associated with the UE device to the at least one network entity. For example, vehicle 302 may transmit a communication range (e.g., feedback distance) to network coding device 310. In some cases, the communication range may indicate whether a receiving UE device is expected to provide feedback for a sidelink communication.

In some aspects, the process 700 may include determining that the priority level associated with the sidelink communication is above a first threshold value or below a second threshold value, wherein the status of the network coding indicator signals the at least one network entity to perform network coding of the sidelink communication. For example, vehicle 302 may request network coding of sidelink transmission A 312 when the priority level associated with sidelink transmission A 312 is above a threshold value for high-priority traffic. In another example, vehicle 304 may request network coding of sidelink transmission B 314 when the priority level associated with sidelink transmission B 314 is below a threshold value for low-priority traffic.

In some cases, the process 700 may include determining, by the UE device, a number of receiving UE devices associated with the sidelink communication. For example, vehicle 302 may determine that there are two receiving UE devices (e.g., vehicle 306 and vehicle 308) associated with sidelink transmission A 312. In some cases, the number of receiving UE devices associated with a sidelink communication may be referred to as a receiving UE group size. In some examples, the process 700 may include transmitting the number of receiving UE devices associated with the sidelink communication to the at least one network entity. For instance, vehicle 302 may transmit an indication of two receiving UE devices associated with sidelink transmission A 312 to network coding device 310.

Figure 8:
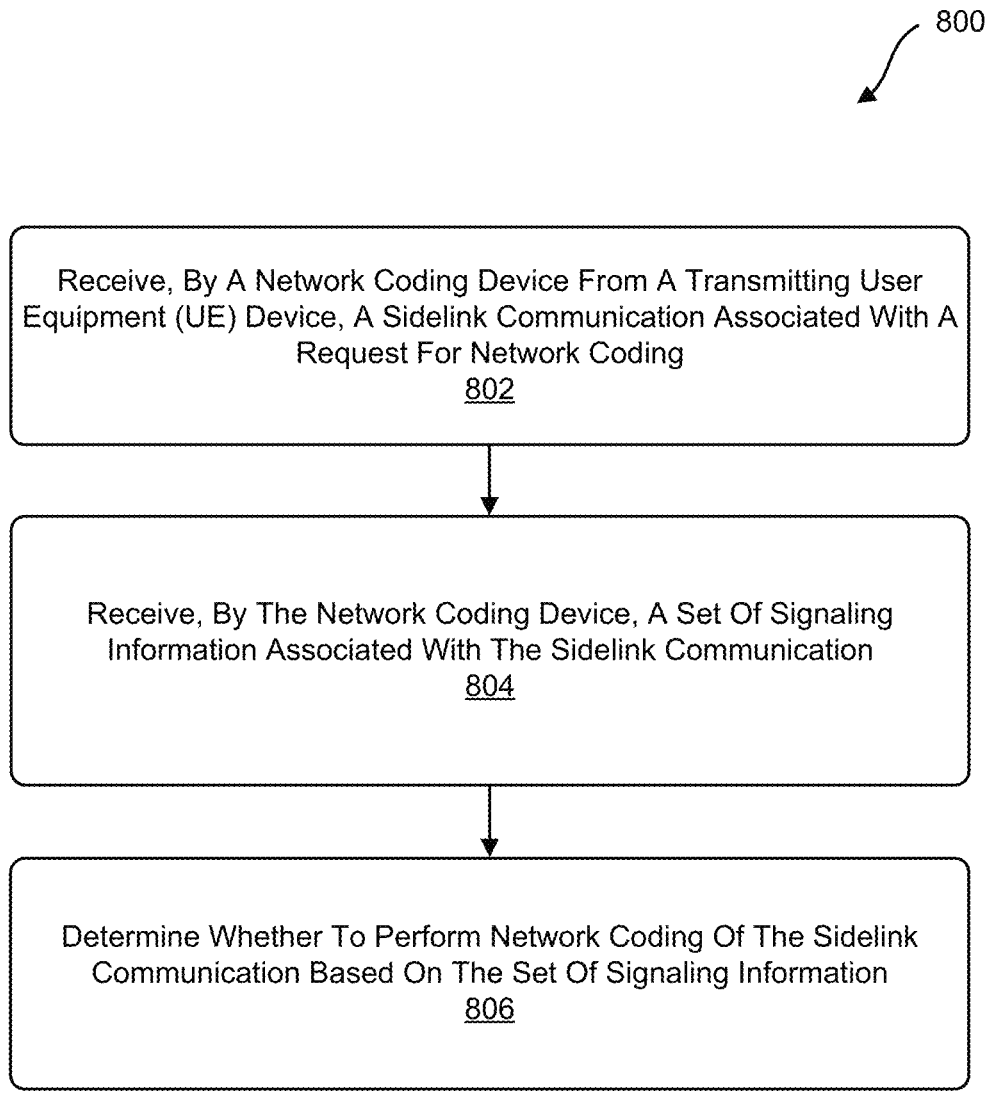
FIG. 8 is a flow diagram illustrating an example of a process for implementing network coding of sidelink communications, according to aspects of the disclosure.

FIG. 8 is a flowchart diagram illustrating an example of a process 800 for implementing network coding of sidelink communications. At block 802, the process 800 may include receiving, by a network coding device from a transmitting user equipment (UE) device, a sidelink communication associated with a request for network coding. For example, network coding device 310 may receive sidelink transmission A 312 from vehicle 302. In some aspects, sidelink transmission A 312 may be associated with a request for network coding (e.g., the sidelink transmission may include or be associated with a network coding indicator used to signal a request for network coding).

At block 804, the process 800 may include receiving, by the network coding device, a set of signaling information associated with the sidelink communication. For instance, network coding device 310 may receive a set of signaling information associated with sidelink transmission A 312 and/or sidelink transmission B 314. In some aspects, the set of signaling information may correspond to at least one of sidelink control information (SCI), a medium access control (MAC) control element (CE), and a PC5 radio resource control (RRC) signal. At block 806, the process 800 may include determining whether to perform network coding of the sidelink communication based on the set of signaling information.

In some aspects, the set of signaling information may include a receiving UE group size associated with the sidelink communication. For instance, the set of signaling information may indicate that there are two receiving UE devices (e.g., vehicle 306 and vehicle 308) associated with sidelink transmission A 312.

In some examples, the process 800 may include receiving, by the network coding device, a number of acknowledgements corresponding to the sidelink communication that is less than the receiving UE group size associated with the sidelink communication. For instance, network coding device 310 may receive an acknowledgment for sidelink transmission A 312 from vehicle 306 indicating that vehicle 306 received and/or decoded sidelink transmission A 312. In some aspects, network coding device 310 may not receive an acknowledgment for sidelink transmission A 312 from vehicle 308 because vehicle 308 failed to receive and/or decode sidelink transmission A 312 (e.g., as indicated by the "X" in FIG. 3A). In some aspects, the number of acknowledgments received by network coding device 310 may be less than the receiving UE group size (e.g., 1 acknowledgement is less than 2 receiving UE devices). In some aspects, the process 800 may include transmitting a network coded sidelink transmission that includes the sidelink communication in response to receiving a number of acknowledgements that is less than the receiving UE group size. For instance, network coding device 310 may transmit network coded transmission 316 (e.g., including sidelink transmission A 312 and/or data associated with sidelink transmission A 312) in response to determining that the number of acknowledgments is less than the receiving UE group size.

In some cases, the set of signaling information may include location data associated with the transmitting UE device. For example, the signaling information received by network coding device 310 may include location data (e.g., geographic coordinates, zone identification, etc.) associated with vehicle 302. In some aspects, the process 800 may include determining, based on the location data, a distance between the network coding device and the transmitting UE device. For instance, network coding device 310 may use the location data to determine a distance between network coding device 310 and vehicle 302. In some examples, the process 800 may include transmitting a network coded sidelink transmission that includes the sidelink communication in response to determining that the distance is less than a threshold value. For instance, network coding device 310 may transmit network coded transmission 316 (e.g., including sidelink transmission A 312 and/or data associated with sidelink transmission A 312) in response to determining that vehicle 302 is located within a threshold distance of network coding device 310.

In some examples, the set of signaling information may include at least one packet delay budget (PDB) parameter associated with the sidelink communication, wherein the at least one PDB parameter includes at least one of a number of slots, a remaining time, an expiration time, and an expiration slot. For example, the signaling information received by network coding device 310 may include at least one PDB parameter associated with sidelink transmission A 312. In some aspects, the process 800 may include determining a priority for the network coding of the sidelink communication based on the at least one PDB parameter. For instance, network coding device 310 may determine a priority for performing network coding of sidelink transmission A 312, sidelink transmission B 314, and/or any other sidelink transmission based on one or more PDB parameters.

In some cases, the set of signaling information may include a communication range associated with the transmitting UE device. For example, the set of signaling information received by network coding device 310 may include a communication range associated with vehicle 302. In some aspects, the process 800 may include transmitting, by the network coding device, a network coded sidelink transmission that includes the sidelink communication and an indication of the communication range. For instance, network coding device 310 may transmit network coded transmission 316 that may include sidelink transmission A 312 (e.g., data associated with sidelink transmission A 312) and an indication of a communication range associated with vehicle 302.

In some examples, the processes described herein (e.g., process 400, process 500, sequence 600, process 700, process 800, and/or other process described herein) may be performed by a computing device or apparatus (e.g., a UE, an RSU, a base station, etc.). In one example, the process 700 and/or process 800 may be performed by a wireless communication device, such as a UE (e.g., wireless device 207, network coding device 310, a mobile device, and/or other UE or device). In another example, the process 700 and/or process 800 may be performed by a computing device with the computing system 900 shown in FIG. 9. For instance, a wireless communication device (e.g., wireless device 207, network coding device 310, and/or other UE or device) with the computing architecture shown in FIG. 9 may include the components of the UE and may implement the operations of FIG. 7 and/or the operations of FIG. 8.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The processes 700 and 800 are illustrated as logical flow diagrams, the operation of which represents a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, process 400, process 500, sequence 600, process 700, process 800, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
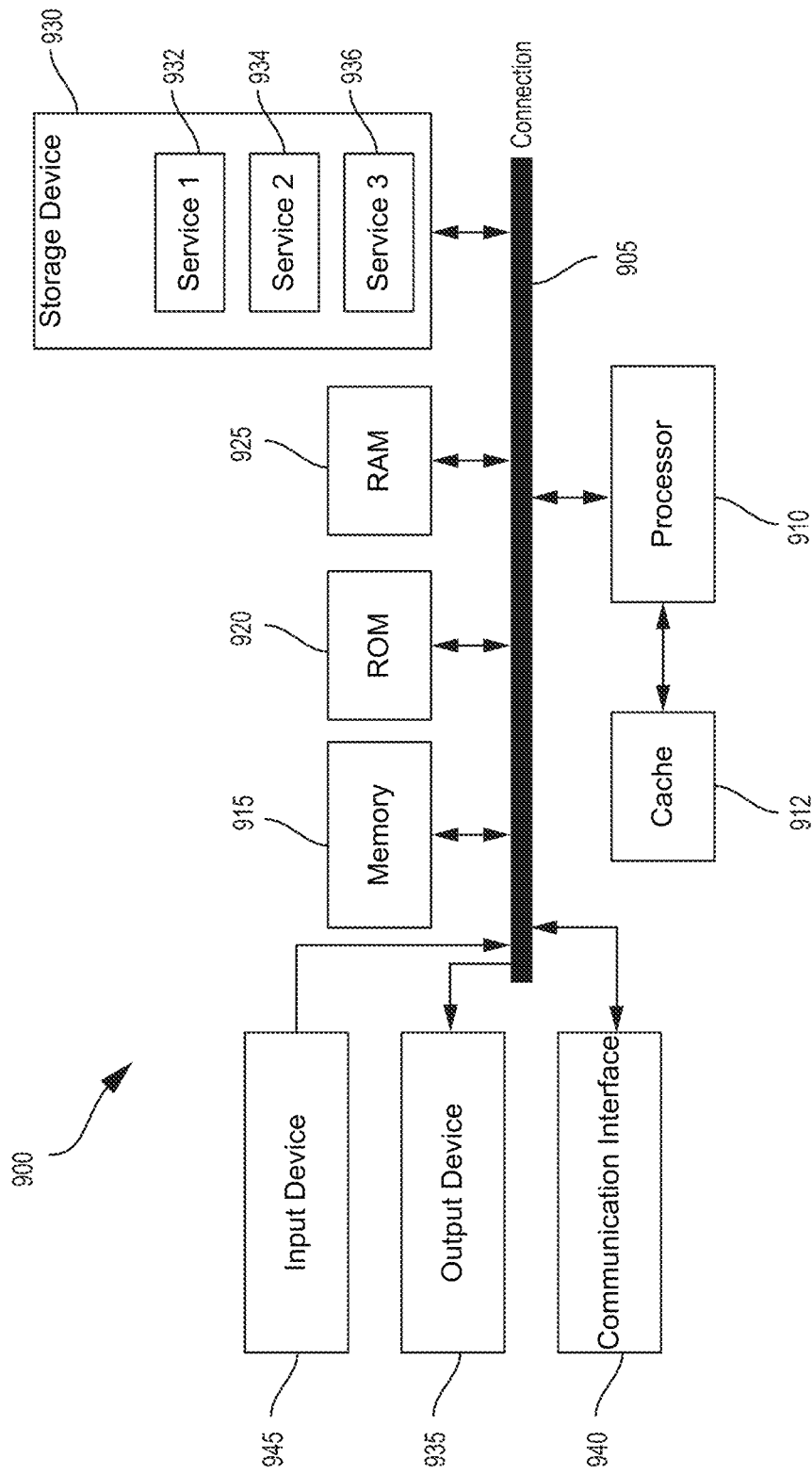
FIG. 9 is a block diagram illustrating an example of a computing system, according to aspects of the disclosure.

FIG. 9 is a diagram illustrating an example of a system for implementing certain aspects of the present technology. In particular, FIG. 9 illustrates an example of computing system 900, which may be for example any computing device making up internal computing system, a remote computing system, a camera, or any component thereof in which the components of the system are in communication with each other using connection 905. Connection 905 may be a physical connection using a bus, or a direct connection into processor 910, such as in a chipset architecture. Connection 905 may also be a virtual connection, networked connection, or logical connection.

In some embodiments, computing system 900 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 900 includes at least one processing unit (CPU or processor) 910 and connection 905 that communicatively couples various system components including system memory 915, such as read-only memory (ROM) 920 and random access memory (RAM) 925 to processor 910. Computing system 900 may include a cache 912 of high-speed memory connected directly with, in close proximity to, or integrated as part of processor 910.

Processor 910 may include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which may represent any number of input mechanisms, such as a microphone for speech, a touch-sensitive screen for gesture or graphical input, keyboard, mouse, motion input, speech, etc. Computing system 900 may also include output device 935, which may be one or more of a number of output mechanisms. In some instances, multimodal systems may enable a user to provide multiple types of input/output to communicate with computing system 900.

Computing system 900 may include communications interface 940, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON' wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 930 may include software services, servers, services, etc., that when the code that defines such software is executed by the processor 910, it causes the system to perform a function. In some embodiments, a hardware service that performs a particular function may include the software component stored in a computer-readable medium in connection with the necessary hardware components, such as processor 910, connection 905, output device 935, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1: A wireless communication device for wireless communication. The wireless communication device includes at least one memory and at least one processor coupled to the at least one memory. The at least one processor is configured to: determine at least one parameter associated with a sidelink communication; determine, based on the at least one parameter, a status of a network coding indicator corresponding to the sidelink communication; and transmit the sidelink communication and the network coding indicator including the determined status to at least one network entity configured to perform network coding.

Aspect 2: The wireless communication device according to aspect 1, wherein the at least one parameter includes a priority level associated with the sidelink communication.

Aspect 3: The wireless communication device according to aspect 2, wherein the at least one processor is further configured to: determine that the priority level associated with the sidelink communication is above a first threshold value or below a second threshold value, wherein the status of the network coding indicator signals the at least one network entity to perform network coding of the sidelink communication.

Aspect 4: The wireless communication device according to any one of aspects 1 to 3, wherein the at least one parameter includes at least one packet delay budget (PDB) parameter associated with the sidelink communication.

Aspect 5: The wireless communication device according to aspect 4, wherein the at least one processor is further configured to: transmit the at least one PDB parameter associated with the sidelink communication to the at least one network entity.

Aspect 6: The wireless communication device according to any one of aspects 1 to 5, wherein the at least one parameter includes a number of times that a data packet associated with the sidelink communication has been transmitted.

Aspect 7: The wireless communication device according to any one of aspects 1 to 6, wherein the at least one processor is further configured to: determine a number of receiving UE devices associated with the sidelink communication; and transmit the number of receiving UE devices associated with the sidelink communication to the at least one network entity.

Aspect 8: The wireless communication device according to any one of aspects 1 to 7, wherein the at least one processor is further configured to: transmit location data associated with the wireless communication device to the at least one network entity.

Aspect 9: The wireless communication device according to any one of aspects 1 to 8, wherein the at least one processor is further configured to: transmit a communication range associated with the wireless communication device to the at least one network entity.

Aspect 10: The wireless communication device according to any one of aspects 1 to 9, wherein the network coding indicator corresponds to at least one of sidelink control information (SCI), a medium access control (MAC) control element (CE), and a PC5 radio resource control (RRC) signal.

Aspect 11: A method of performing any of the operations of aspects 1 to 10.

Aspect 12: A computer-readable storage medium storing instructions that, when executed, cause one or more processors to perform any of the operations of aspects 1 to 10.

Aspect 13: An apparatus comprising means for performing any of the operations of aspects 1 to 10.

Aspect 14: A wireless communication device for wireless communication. The wireless communication device includes at least one memory and at least one processor coupled to the at least one memory. The at least one processor is configured to: receive, from a transmitting user equipment (UE) device, a sidelink communication associated with a request for network coding; receive a set of signaling information associated with the sidelink communication; and determine whether to perform network coding of the sidelink communication based on the set of signaling information.

Aspect 15: The wireless communication device according to aspect 14, wherein the set of signaling information includes a receiving UE group size associated with the sidelink communication.

Aspect 16: The wireless communication device according to aspect 15, wherein the at least one processor is further configured to: receive a number of acknowledgments corresponding to the sidelink communication that is less than the receiving UE group size associated with the sidelink communication; and in response, transmit a network coded sidelink transmission that includes the sidelink communication.

Aspect 17: The wireless communication device according to any one of aspects 14 to 16, wherein the set of signaling information includes location data associated with the transmitting UE device.

Aspect 18: The wireless communication device according to aspect 17, wherein the at least one processor is further configured to: determine, based on the location data, a distance between the network coding device and the transmitting UE device; and in response to determining that the distance is less than a threshold value, transmit a network coded sidelink transmission that includes the sidelink communication.

Aspect 19: The wireless communication device according to any one of aspects 14 to 18, wherein the set of signaling information includes at least one packet delay budget (PDB) parameter associated with the sidelink communication, wherein the at least one PDB parameter includes at least one of a number of slots, a remaining time, an expiration time, and an expiration slot.

Aspect 20: The wireless communication device according to aspect 19, wherein the at least one processor is further configured to: determine a priority for the network coding of the sidelink communication based on the at least one PDB parameter.

Aspect 21: The wireless communication device according to any one of aspects 14 to 20, wherein the set of signaling information includes a communication range associated with the transmitting UE device.

Aspect 22: The wireless communication device according to aspect 21, wherein the at least one processor is further configured to: transmit a network coded sidelink transmission that includes the sidelink communication and an indication of the communication range.

Aspect 23: The wireless communication device according to any of aspects 14 to 22, wherein the set of signaling information corresponds to at least one of sidelink control information (SCI), a medium access control (MAC) control element (CE), and a PC5 radio resource control (RRC) signal.

Aspect 24: A method of performing any of the operations of aspects 14 to 23.

Aspect 25: A computer-readable storage medium storing instructions that, when executed, cause one or more processors to perform any of the operations of aspects 14 to 23.

Aspect 26: An apparatus comprising means for performing any of the operations of aspects 14 to 23.

What is claimed is:

1. A method for wireless communications, comprising:
    determining, by a user equipment (UE) device, at least one parameter associated with a sidelink communication, wherein the at least one parameter includes a priority level associated with the sidelink communication;
    determining that the priority level associated with the sidelink communication is above a first threshold value or below a second threshold value;
    determining, based on the at least one parameter, a status of a network coding indicator corresponding to the sidelink communication; and
    transmitting, by the UE device, the sidelink communication and the network coding indicator including the determined status to at least one network entity configured to perform network coding, wherein the status of the network coding indicator signals the at least one network entity to perform network coding of the sidelink communication.

2. The method of claim 1, wherein the at least one parameter includes at least one packet delay budget (PDB) parameter associated with the sidelink communication.

3. The method of claim 2, further comprising:
    transmitting the at least one PDB parameter associated with the sidelink communication to the at least one network entity.

4. The method of claim 1, wherein the at least one parameter includes a number of times that a data packet associated with the sidelink communication has been transmitted.

5. The method of claim 1, further comprising:
determining, by the UE device, a number of receiving UE devices associated with the sidelink communication; and
transmitting the number of receiving UE devices associated with the sidelink communication to the at least one network entity.

6. The method of claim 1, further comprising:
transmitting location data associated with the UE device to the at least one network entity.

7. The method of claim 1, further comprising:
transmitting a communication range associated with the UE device to the at least one network entity.

8. The method of claim 1, wherein the network coding indicator corresponds to at least one of sidelink control information (SCI), a medium access control (MAC) control element (CE), and a PC5 radio resource control (RRC) signal.

9. A wireless communication device for wireless communication, comprising:
at least one memory; and
at least one processor coupled to the at least one memory and configured to:
determine at least one parameter associated with a sidelink communication, wherein the at least one parameter includes a priority level associated with the sidelink communication;
determine that the priority level associated with the sidelink communication is above a first threshold value or below a second threshold value;
determine, based on the at least one parameter, a status of a network coding indicator corresponding to the sidelink communication; and
transmit the sidelink communication and the network coding indicator including the determined status to at least one network entity configured to perform network coding, wherein the status of the network coding indicator signals the at least one network entity to perform network coding of the sidelink communication.

10. The wireless communication device of claim 9, wherein the at least one processor is further configured to:
determine a number of receiving UE devices associated with the sidelink communication; and
transmit the number of receiving UE devices associated with the sidelink communication to the at least one network entity.

11. The wireless communication device of claim 9, wherein the at least one processor is further configured to:
transmit location data associated with the wireless communication device.

12. The wireless communication device of claim 9, wherein the at least one parameter includes at least one packet delay budget (PDB) parameter associated with the sidelink communication.

13. The wireless communication device of claim 12, wherein the at least one processor is further configured to:
transmit the PDB parameter associated with the sidelink communication to the at least one network entity.

14. The wireless communication device of claim 9, wherein the at least one parameter includes a number of times that a data packet associated with the sidelink communication has been transmitted.

15. The wireless communication device of claim 9, wherein the at least one processor is further configured to:
transmit a communication range associated with the wireless communication device to the at least one network entity.

16. The wireless communication device of claim 9, wherein the network coding indicator corresponds to at least one of sidelink control information (SCI), a medium access control (MAC) control element (CE), and a PC5 radio resource control (RRC) signal.

\* \* \* \* \*